(12) United States Patent
Yang et al.

(10) Patent No.: US 11,647,546 B2
(45) Date of Patent: May 9, 2023

(54) METHOD AND DEVICE FOR TRANSMITTING AND RECEIVING SIGNALS IN WIRELESS COMMUNICATION SYSTEM

(71) Applicant: LG Electronics Inc., Seoul (KR)

(72) Inventors: Suckchel Yang, Seoul (KR); Hyunsoo Ko, Seoul (KR); Seonwook Kim, Seoul (KR); Changhwan Park, Seoul (KR); Joonkui Ahn, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 93 days.

(21) Appl. No.: 17/278,184

(22) PCT Filed: Sep. 23, 2019

(86) PCT No.: PCT/KR2019/012338
§ 371 (c)(1),
(2) Date: Mar. 19, 2021

(87) PCT Pub. No.: WO2020/060358
PCT Pub. Date: Mar. 26, 2020

(65) Prior Publication Data
US 2021/0352737 A1 Nov. 11, 2021

(30) Foreign Application Priority Data

Sep. 21, 2018 (KR) .................. 10-2018-0114480
Nov. 2, 2018 (KR) .................. 10-2018-0133903
Jan. 11, 2019 (KR) .................. 10-2019-0004185

(51) Int. Cl.
*H04W 74/08* (2009.01)
*H04W 74/00* (2009.01)

(52) U.S. Cl.
CPC ..... *H04W 74/0841* (2013.01); *H04W 74/006* (2013.01); *H04W 74/0816* (2013.01); *H04W 74/0891* (2013.01)

(58) Field of Classification Search
CPC .......... H04W 74/006; H04W 74/0816; H04W 74/0833; H04W 74/0841; H04W 74/0891
See application file for complete search history.

(56) References Cited

U.S. PATENT DOCUMENTS

2013/0242730 A1* 9/2013 Pelletier ............ H04W 74/0833
370/230
2014/0098761 A1* 4/2014 Lee ...................... H04W 72/005
370/329

(Continued)

FOREIGN PATENT DOCUMENTS

KR  1020150064196    6/2015
WO  WO-0115344 A1 * 3/2001 ............ A61K 31/415

OTHER PUBLICATIONS

Huawei (Rapporteur), "Introduction of NB-IoT," R2-162310, 3GPP TSG-RAN WG2 Meeting #93BIS, Dubrovnik, Croatia, dated Apr. 11-15, 2016, 293 pages.

(Continued)

*Primary Examiner* — Kashif Siddiqui
(74) *Attorney, Agent, or Firm* — Fish & Richardson P.C.

(57) ABSTRACT

A method and a device for transmitting and receiving signals in a wireless communication system according to one embodiment of the present invention are characterized by transmitting a PRACH on a RO, receiving, in response to the PRACH, a PDCCH for receiving a RAR, and receiving the RAR on the basis of the PDCCH, wherein the RAR includes a portion of the bits of a frame index of the RO on which the PRACH was transmitted.

19 Claims, 19 Drawing Sheets

(56) References Cited

U.S. PATENT DOCUMENTS

| | | | | |
|---|---|---|---|---|
| 2015/0043455 A1* | 2/2015 | Miklos | .................. | H04W 76/11 |
| | | | | 370/329 |
| 2015/0282047 A1* | 10/2015 | Turtinen | ............... | H04W 48/02 |
| | | | | 370/230 |
| 2016/0100422 A1* | 4/2016 | Papasakellariou | .... | H04L 1/1861 |
| | | | | 370/329 |
| 2016/0309516 A1* | 10/2016 | Wong | ................ | H04W 74/0833 |
| 2018/0132273 A1* | 5/2018 | Zhang | ................... | H04L 5/0053 |
| 2021/0007146 A1* | 1/2021 | Agiwal | ................. | H04W 24/04 |
| 2021/0259027 A1* | 8/2021 | Deogun | ............ | H04W 74/0833 |

OTHER PUBLICATIONS

Nokia, Nokia Shanghai Bell, "Summary of Remaining Details on RACH Procedure," R1-1801274, 3GPP TSG-RAN WG1#NR1801, Vancouver, BC, Canada, dated Jan. 22-26, 2018, 56 pages.

PCT International Search Report and Written Opinion in International Appln. No. PCT/KR2019/012338, dated Jan. 17, 2020, 16 pages (with English translation).

* cited by examiner (a) Carrier aggregation between L-band and U-band (b) Standalone U-band(s)

(a)

(b)

(a)

(b)

METHOD AND DEVICE FOR TRANSMITTING AND RECEIVING SIGNALS IN WIRELESS COMMUNICATION SYSTEM

CROSS-REFERENCE TO RELATED APPLICATIONS

This application is a National Stage application under 35 U.S.C. § 371 of International Application No. PCT/KR2019/012338, filed on Sep. 23, 2019, which claims the benefit of Korean Application Nos. 10-2019-0004185, filed on Jan. 11, 2019, 10-2018-0133903, filed on Nov. 2, 2018, and 10-2018-0114480, filed on Sep. 21, 2018. The disclosures of the prior applications are incorporated by reference in their entirety.

TECHNICAL FIELD

The present disclosure relates to a method and apparatus used in a wireless communication system, and more particularly, to a method and apparatus for transmitting and receiving a signal related to random access.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

Provided are a method and apparatus for transmitting and receiving signals, in which a random access procedure is efficiently performed in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for receiving a signal in a wireless communication system.

In one aspect of the present disclosure, a method of transmitting and receiving a signal by a communication device in a wireless communication system includes transmitting a physical random access channel (PRACH) in a random access channel occasion (RO), receiving a physical downlink control channel (PDCCH) for scheduling a random access response (RAR) in response to the PRACH, and receiving the RAR based on the PDCCH. The RAR includes partial bits of a frame index of an RO in which the PRACH was transmitted.

In another aspect of the present disclosure, a communication device for transmitting and receiving a signal in a wireless communication system includes at least one transceiver, at least one processor, and at least one memory operatively coupled to the at least one processor and storing instructions which when executed, cause the at least one processor to perform specific operations. The specific operations include transmitting a PRACH in an RO, receiving a PDCCH for scheduling an RAR in response to the PRACH, and receiving the RAR based on the PDCCH. The RAR includes partial bits of a frame index of an RO in which the PRACH was transmitted.

In the method or the device, the frame index may be a system frame number.

In the method or the device, the PDCCH may be masked with a random access-radio network temporary identifier (RA-RNTI).

In the method or the device, the RA-RNTI may be configured based on at least one of remaining indexes except for the frame index, among resource indexes related to the RO in which the PRACH was transmitted.

In the method or the device, the remaining indexes may include at least one of a symbol index, a slot index, a frequency index, a subband index, and/or a carrier index.

In the method or the device, the partial bits may be least significant bits (LSBs) or most significant bits (MSBs) of the frame index.

In the method or the device, the communication device may detect a synchronization signal block (SSB), and configuring an RO set for the detected SSB. The RO set may include N ROs, the RO in which the PRACH was transmitted may be an RO for which listen-before-talk (LBT) is successful among the N ROs, the N ROs may be allocated based on an RO group in a preconfigured resource area, and the RO group may include R ROs located in different time domains of the same frequency domain in the preconfigured resource area.

In the method or the device, the N ROs may be allocated in units of an RO group sequentially in frequency from a low frequency, with ROs being allocated sequentially in time in the same RO group.

In the method or the device, the N ROs may be allocated sequentially in frequency in units of an RO in N' frequency areas from a low frequency, the allocation in units of an RO may be repeated in a time-domain area, and N' may be a value obtained by dividing N by R.

The communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication device may perform a random access procedure more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)

Figure 1:
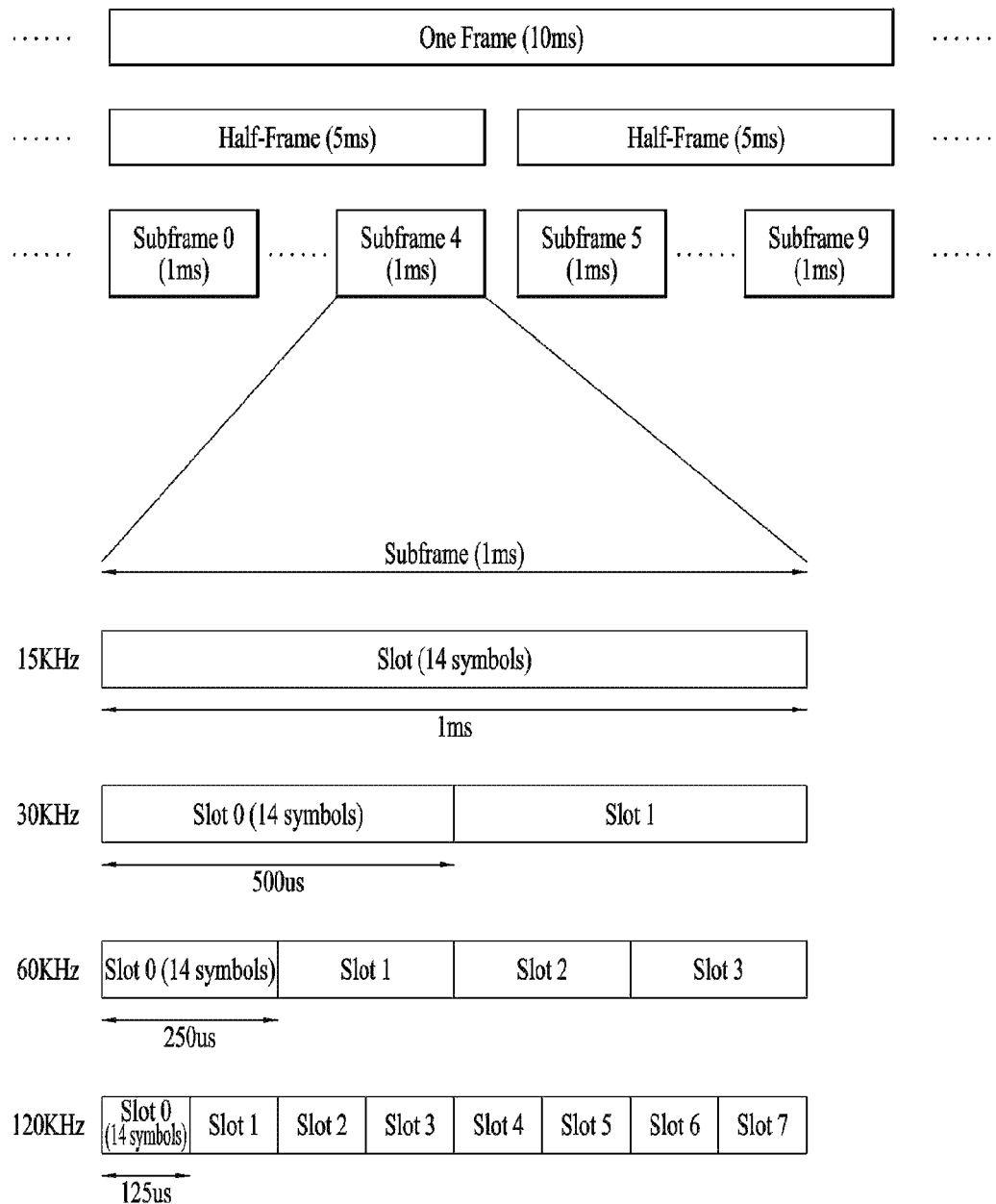
FIG. 1 illustrates a radio frame structure.

3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (n = 3) | 14 | 80 | 8 |
| 240 KHZ (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
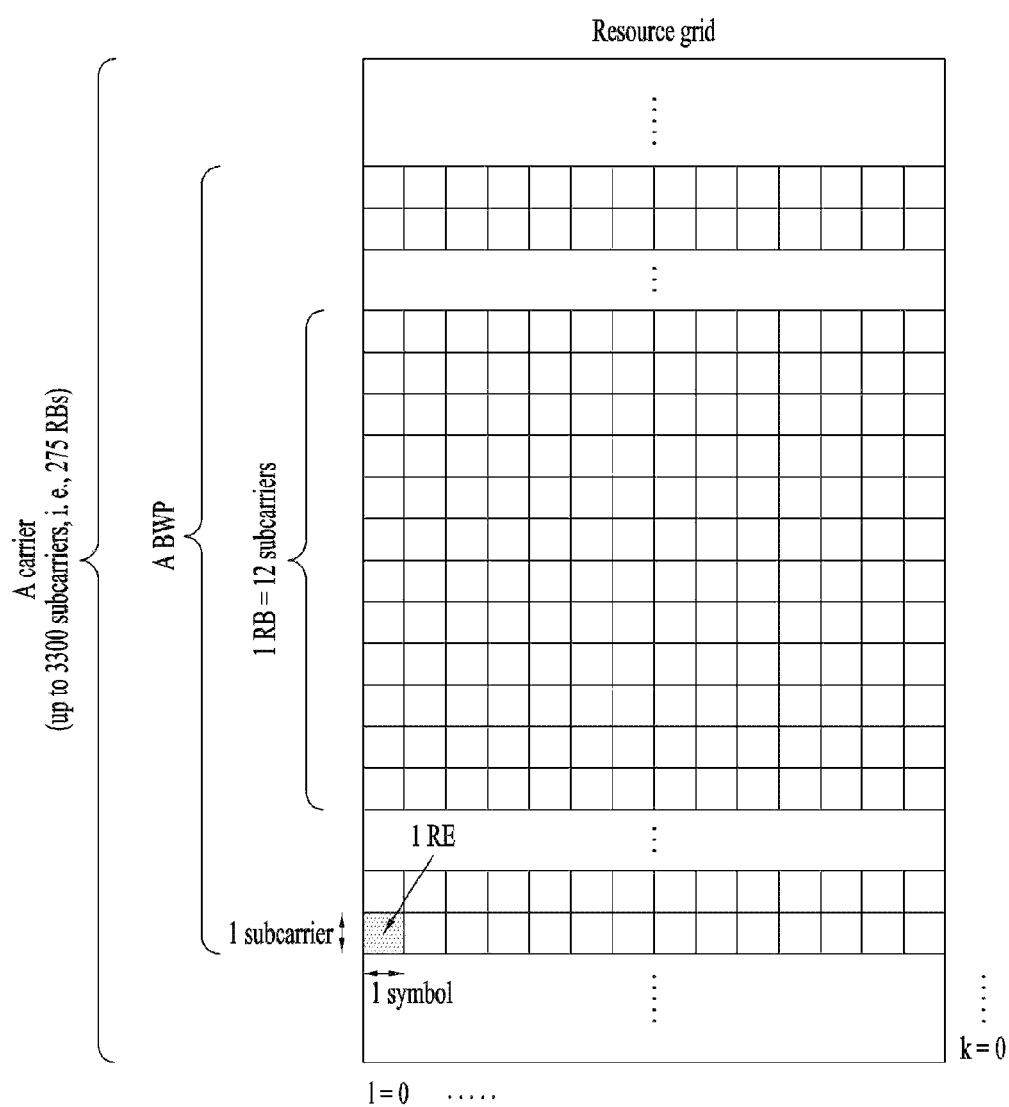
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
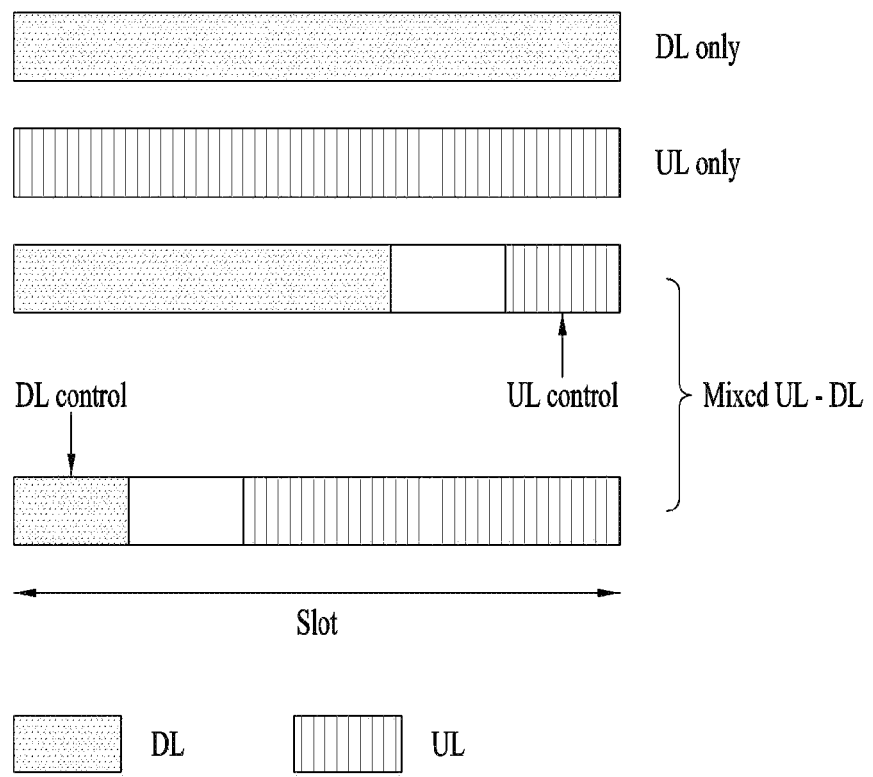
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
DL region+Guard period (GP)+UL control region
DL control region+GP+UL region
DL region: (i) DL data region, (ii) DL control region+DL data region
UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

1. Wireless Communication System Supporting Unlicensed Band

Figure 4:
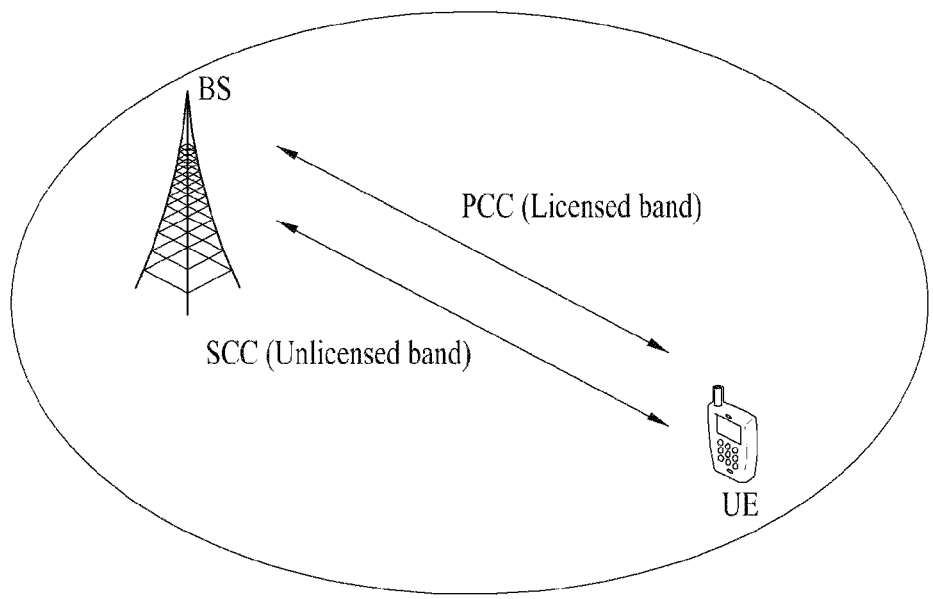
FIG. 4 illustrates a wireless communication system supporting an unlicensed band.
Figure 4:
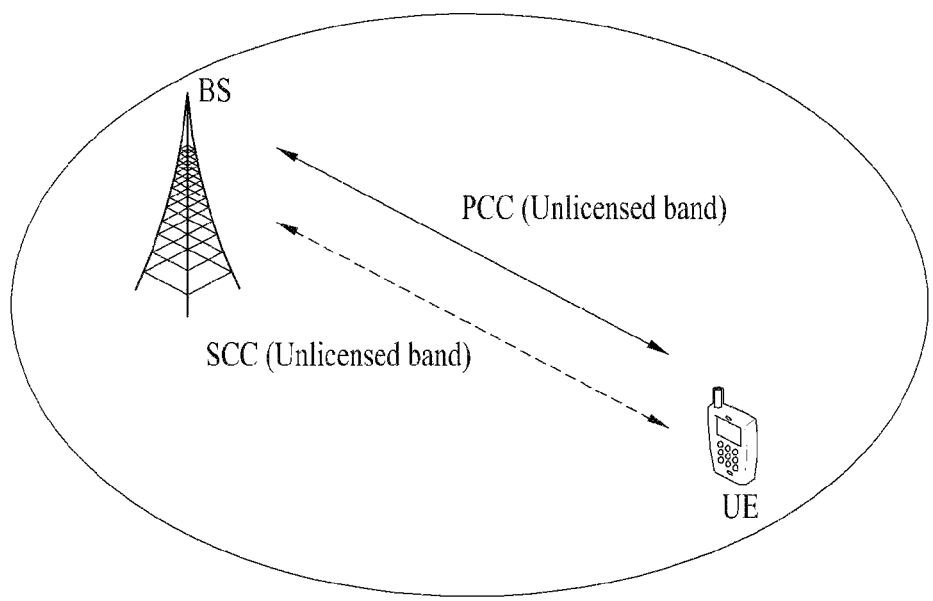

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 4(a), the LCC may be configured as a primary CC (PCC) and the UCC may be configured as a secondary CC (SCC). As illustrated in FIG. 4(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

Radio Frame Structure for Unlicensed Band

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 5:
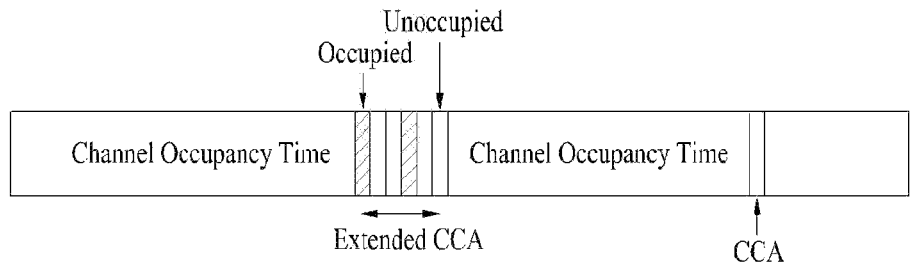
FIG. 5 illustrates a method of occupying resources in an unlicensed band.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of transmitting DL signal in unlicensed band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP method

Figure 6:
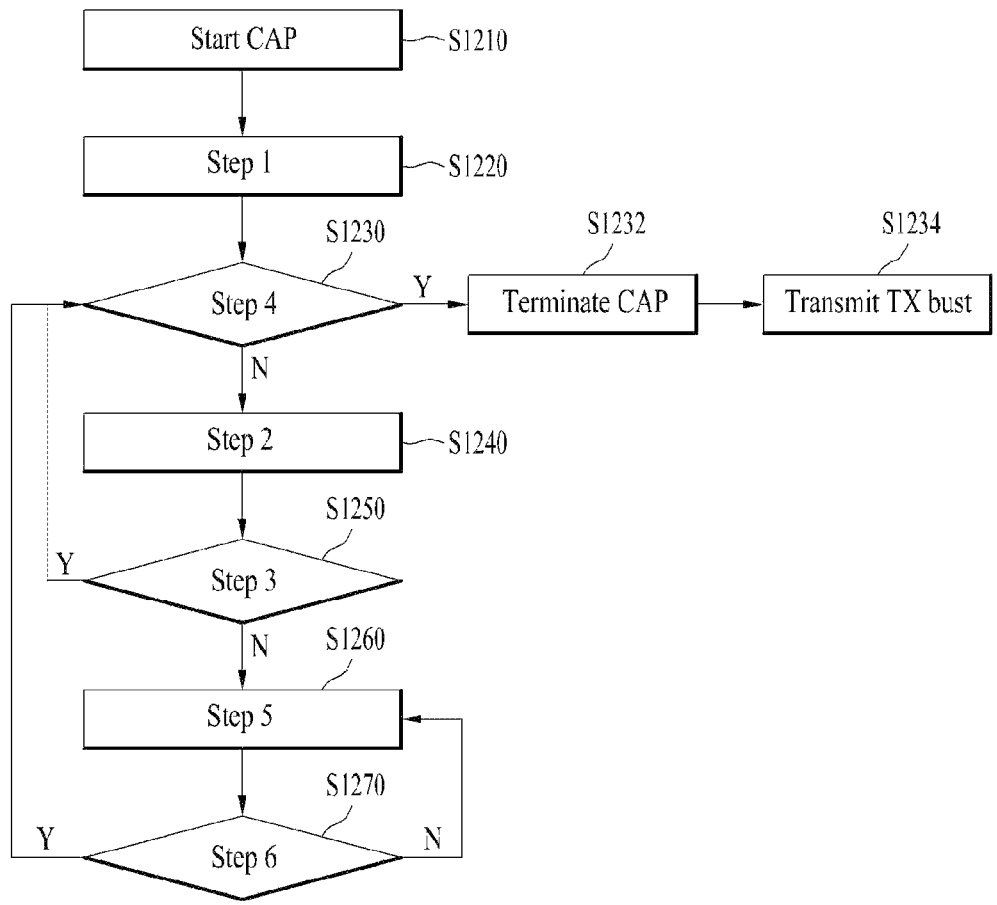
FIGS. 6 and 7 are flowcharts illustrating channel access procedures (CAPs) for signal transmission in an unlicensed band.

FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that mp, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of transmitting UL signal in unlicensed band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 7:
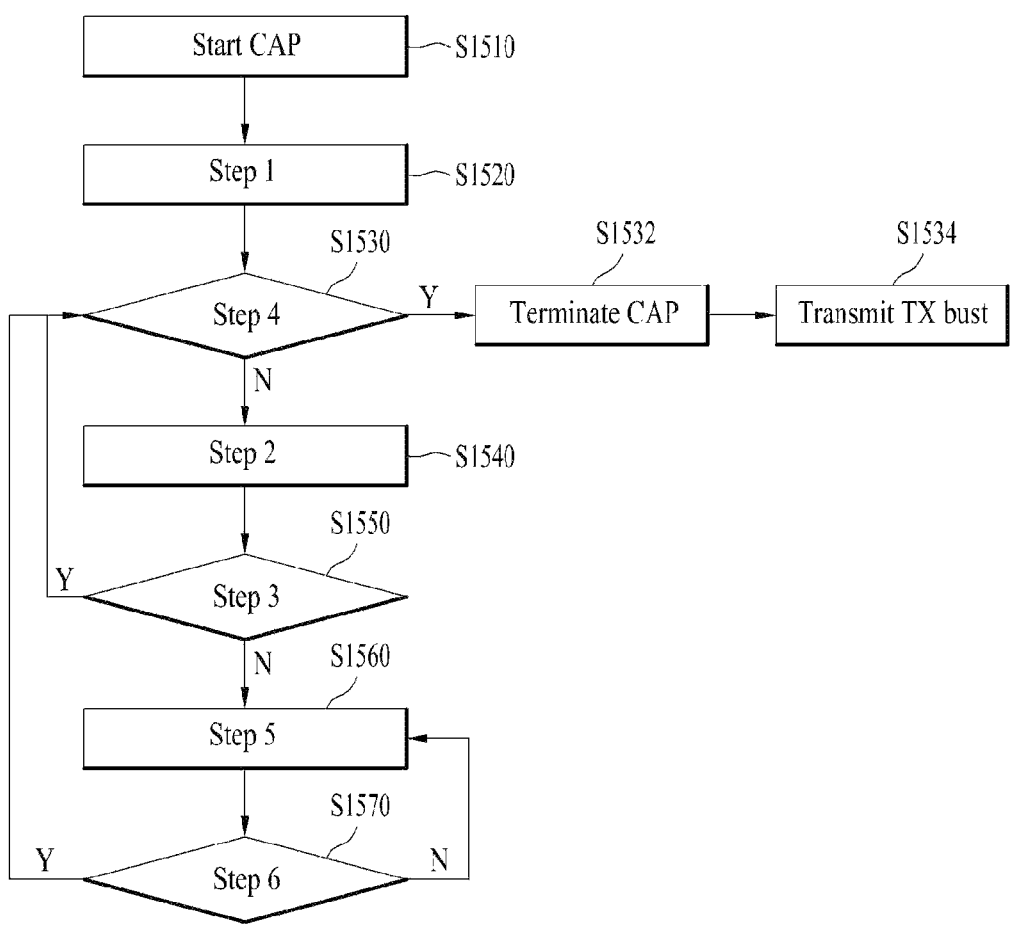

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$. (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class $p \in \{1, 2, 3, 4\}$. Otherwise, the UE may increase $CW_p$ for every priority class $p \in \{1, 2, 3, 4\}$ to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1$, ... $n_w$, starting from the subframe (or slot) $n_0$ without a gap (the subframe (or slot) $n_w$ is the most recent subframe (or slot) before a subframe (or slot) $n_g - 3$ in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

2. SSB(Synchronization Signal Block) Transmission and Related Operations

Figure 8:
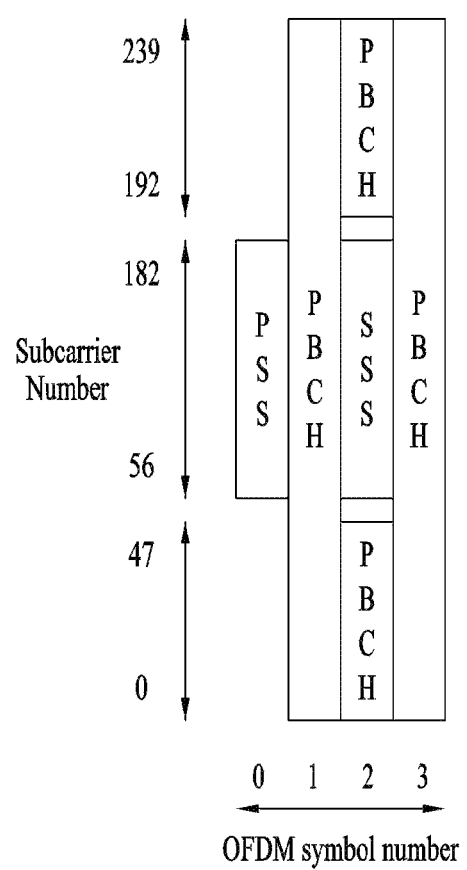
FIG. 8 illustrates a synchronization signal block (SSB) structure.

FIG. 8 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 8, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 5 below.

TABLE 5

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

There are 336 cell ID groups each including three cell IDs. Therefore, there are 1008 cell IDs in total, and a cell ID may be defined by Equation 1.

$$N_{ID}^{cell} = 3N_{ID}^{(1)} + N_{ID}^{(2)} \text{ where } N_{ID}^{(1)} \in \{0,1,\ldots,335\}$$
$$\text{and } N_{ID}^{(2)} \in \{0,1,2\} \quad \text{[Equation 1]}$$

In Equation 1, $N^{cell}_{ID}$ represents a cell ID (e.g., PCID). $N^{(1)}_{ID}$ represents a cell ID group, and is provided by/acquired from an SSS. $N^{(2)}_{ID}$ represents a cell ID in the cell ID group, and is provided by/acquired from a PSS.

A PSS sequence $d_{PSS}(n)$ may be defined to satisfy Equation 22.

$$d_{PSS}(n) = 1 - 2x(m)$$

$$m = (n + 43N_{ID}^{(2)}) \bmod 127$$

$$0 \leq n < 127, \text{ where}$$

$$x(i+7) = (x(i+4) + x(i)) \bmod 2, \text{ and}$$

$$[x(6)\ x(5)\ x(4)\ x(3)\ x(2)\ x(1)\ x(0)] = [1\ 1\ 1\ 0\ 1\ 1\ 0] \quad \text{[Equation 2]}$$

An SSS sequence $d_{SSS}(n)$ may be defined to satisfy Equation 3.

$$d_{SSS}(n) = [1 - 2x_0((n + m_0)\mod 127)][1 - 2x_1((n + m_1)\mod 127)] \quad \text{[Equation 3]}$$

$$m_0 = 15\left\lfloor\frac{N_{ID}^{(1)}}{112}\right\rfloor + 5N_{ID}^{(2)}$$

$$m_1 = N_{ID}^{(1)} \mod 112$$

$$0 \le n < 127, \text{ where,}$$

$$x_0(i + 7) = (x_0(i + 4) + x_0(i))\mod 2$$

$$x_1(i + 7) = (x_1(i + 4) + x_1(i))\mod 2, \text{ and}$$

$$[\,x_0(6) \quad x_0(5) \quad x_0(4) \quad x_0(3) \quad x_0(2) \quad x_0(1) \quad x_0(0)\,] = [\,0 \quad 0 \quad 0 \quad 0 \quad 0 \quad 0 \quad 1\,]$$

$$[\,x_1(6) \quad x_1(5) \quad x_1(4) \quad x_1(3) \quad x_1(2) \quad x_1(1) \quad x_1(0)\,] = [\,0 \quad 0 \quad 0 \quad 0 \quad 0 \quad 0 \quad 1\,]$$

Figure 9:
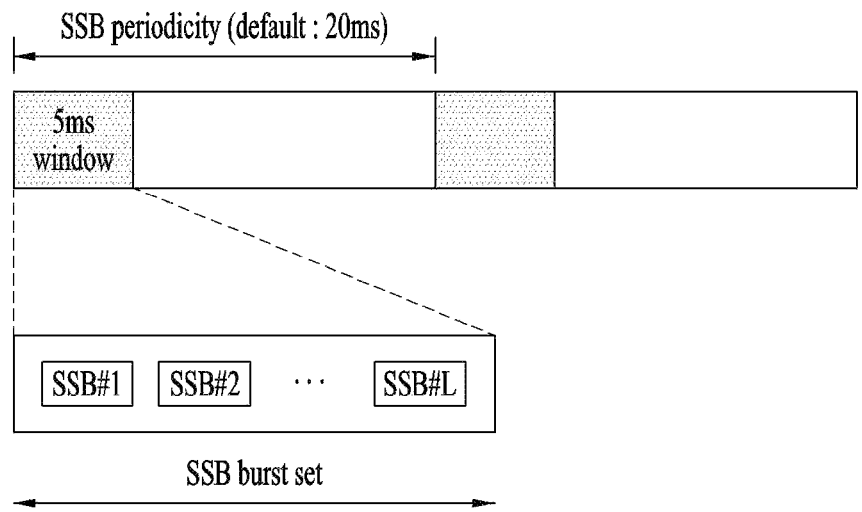
FIG. 9 illustrates SSB transmission.

FIG. 9 illustrates SSB transmission.

An SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 10:
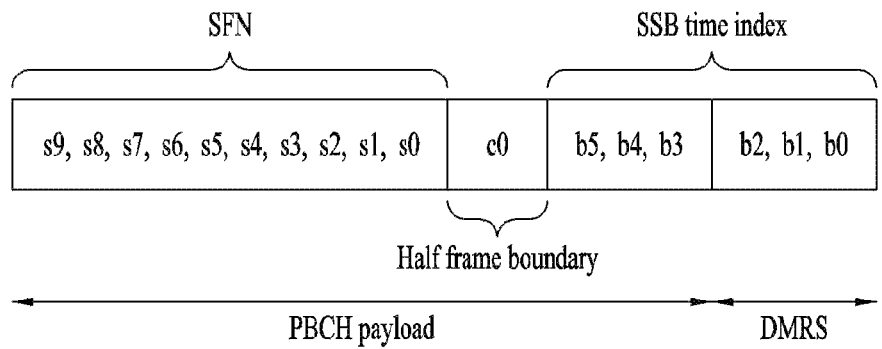
FIG. 10 illustrates acquisition of information about downlink (DL) time synchronization at a user equipment (UE)

FIG. 10 illustrates acquisition of DL time synchronization information at a UE.

The UE may acquire DL synchronization by detecting an SSB. The UE may identify the structure of an SSB burst set based on the index of the detected SSB and thus detect a symbol/slot/half-frame boundary. The number of a frame/half-frame to which the detected SSB belongs may be identified by system frame number (SFN) information and half-frame indication information.

Specifically, the UE may obtain 10-bit SFN information s0 to s9 from the PBCH. 6 bits out of the 10-bit SFN information are obtained from a master information block (MIB), and the remaining 4 bits are obtained from a PBCH transport block (TB).

The UE may then obtain 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may obtain an SSB index based on the DMRS sequence and PBCH payload. SSB candidates are indexed with 0 to L−1 in a time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

System Information Acquisition

Figure 11:
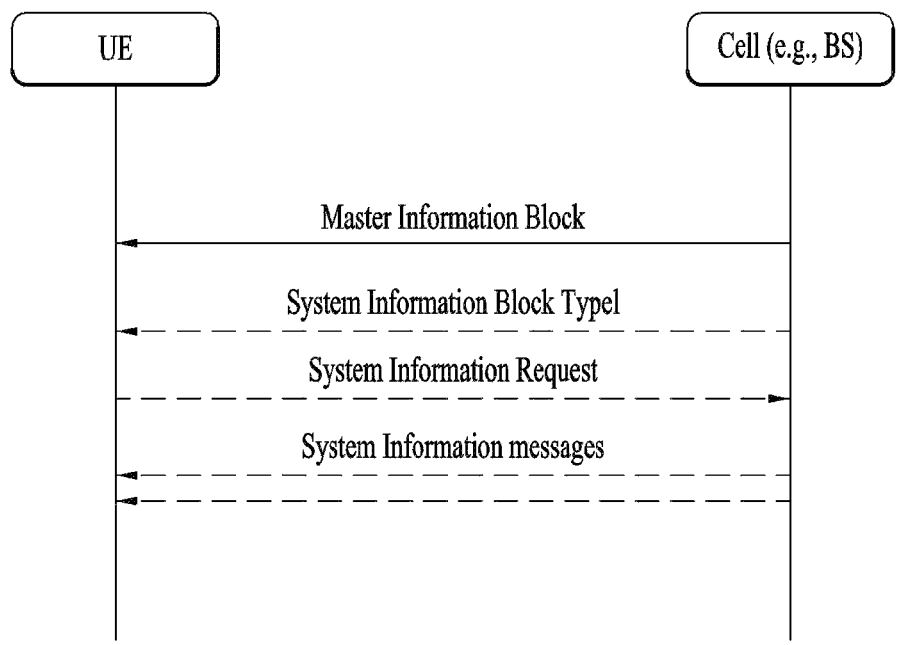
FIG. 11 is a diagram illustrating a signal flow for a process of acquiring system information (SI)

FIG. 11 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

The SI is divided into an MIB and a plurality of system information blocks (SIBs). SI other than the MIB may be referred to as remaining minimum system information (RMSI). For details, the following may be referred to.

The MIB includes information/parameters related to reception of SYstemInformationBlockType1 (SIB1) and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. SIB1 is transmitted on a PDSCH. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Beam Alignment

Figure 12:
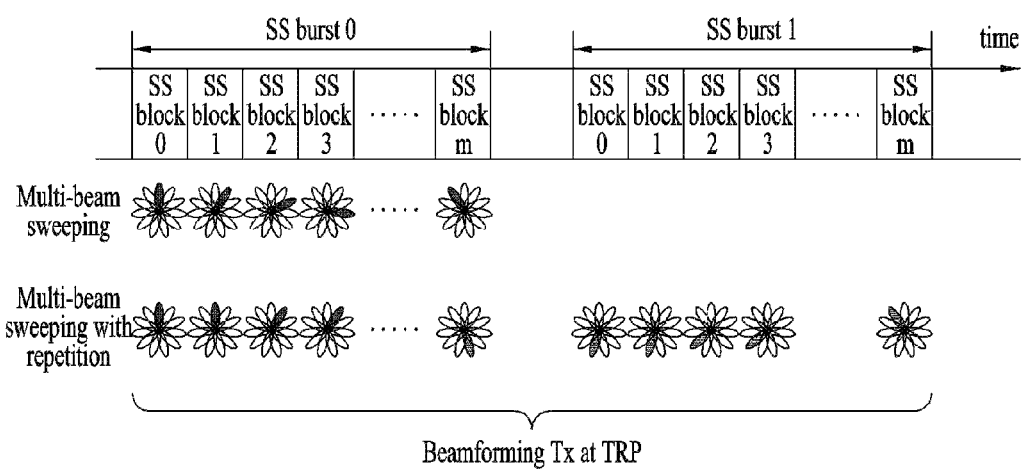
FIG. 12 illustrates multi-beam SSB transmission.

FIG. 12 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Measurement and Rate Matching

Figure 13:
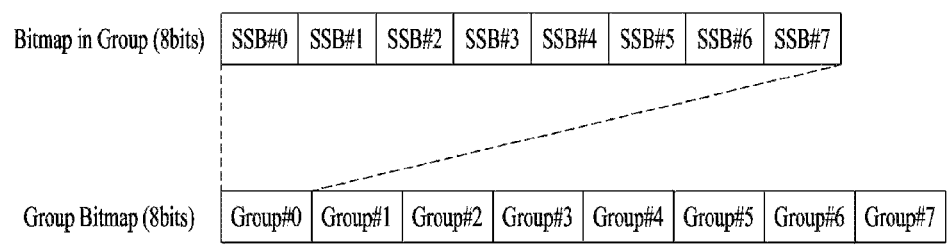
FIG. 13 illustrates a method of indicating an actually transmitted SSB.

FIG. 13 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 13. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

3. Random Access (RA) Procedure

4-Step Random Access Procedure

Now, a random access procedure will be described. The random access procedure is also referred to as a random access channel (RACH) procedure. The random access procedure is used for various purposes including initial access, UL synchronization adjustment, resource allocation, handover, radio link re-establishment after radio link failure, and position measurement. Random access procedures are classified into a contention-based procedure and a dedicated (i.e., non-contention-based) procedure. The contention-based random access procedure generally involves initial access, whereas the dedicated random access procedure is used restrictively in the event of handover, DL data arrival, position measurement, and UL synchronization reconfiguration. In the contention-based random access procedure, the UE randomly selects an RACH preamble sequence. Accordingly, it is possible for a plurality of UEs to simultaneously transmit the same RACH preamble sequence, and thus a subsequent contention resolution process is required. In the dedicated random access procedure, the UE uses an RACH preamble sequence uniquely allocated to the UE by the BS. Therefore, the UE may perform the random access procedure without collision with other UEs.

Figure 14:
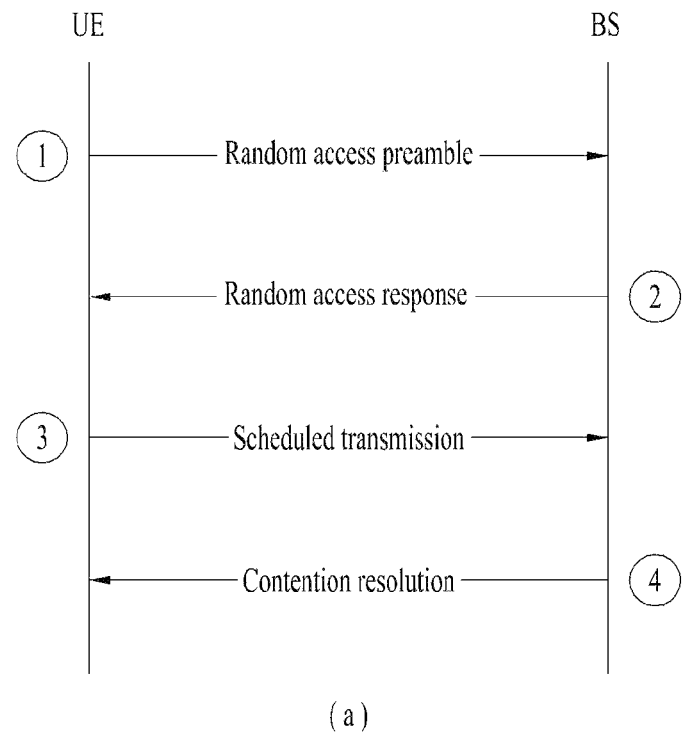
FIG. 14 is a diagram illustrating a signal flow for a 4-step random access procedure.
Figure 14:
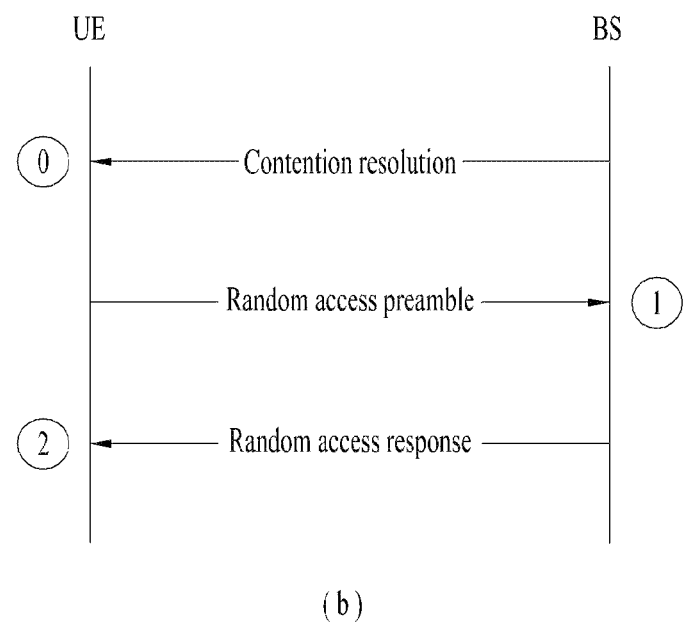

FIG. 14 illustrates random access procedures. FIG. 14(a) illustrates the contention-based random access procedure, and FIG. 14(b) illustrates the dedicated random access procedure.

Referring to FIG. 14(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC Setup message). When information transmitted in Msg3 does not match information received in Msg4, or when the UE has not received Msg4 for a predetermined time, the UE may retransmit Msg3, determining that the contention resolution has failed.

Referring to FIG. 14(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.

Step 1: The UE transmits the RACH preamble on a PRACH.

Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.

RA preamble index: 6 bits

UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.

SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.

PRACH mask index: 4 bits. When the bits of the RA preamble index are all non-zeroes, the PRACH mask index indicates an RACH occasion associated with the SSB indicated by the SSB index. Otherwise, it is reserved.

Reserved: 10 bits

When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ feedback timing indicator, and so on).

2-Step Random Access Procedure

The NR system may require lower latency than the legacy systems. When a random access procedure occurs in a U-band, the random access procedure is terminated and contention is resolved, only when the UE and the BS sequentially succeed in LBT throughout the 4-step random access procedure. When LBT fails even in one step of the 4-step random access procedure, resource efficiency decreases and latency increases. Particularly, when LBT fails in the scheduling/transmission process associated with Msg2 or Msg3, resource efficiency may decrease and latency may increase significantly. Even for a random access procedure in an L-band, low latency may be required in various scenarios of the NR system. Therefore, the 2-step random access procedure may also be performed in the L-band.

To reduce latency in a random access procedure, the 2-step random access procedure may be used in the present disclosure.

Figure 15:
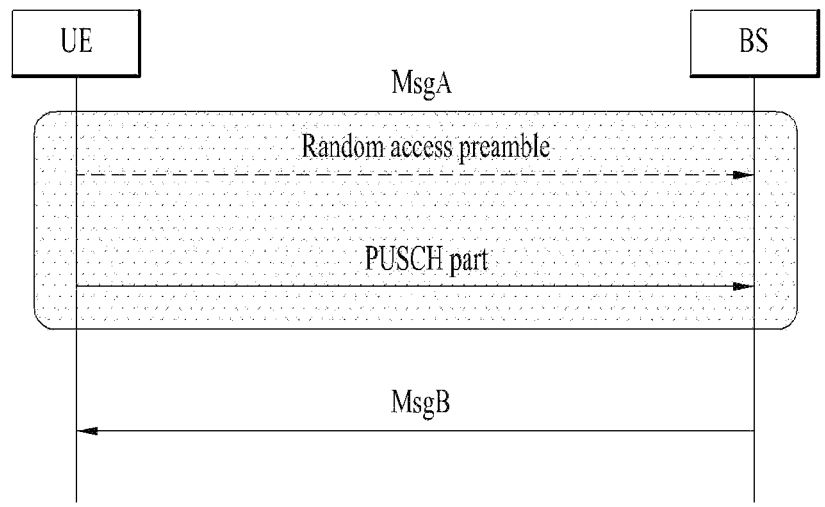
FIG. 15 is a diagram illustrating a signal flow for a 2-step random access procedure.
Figure 15:
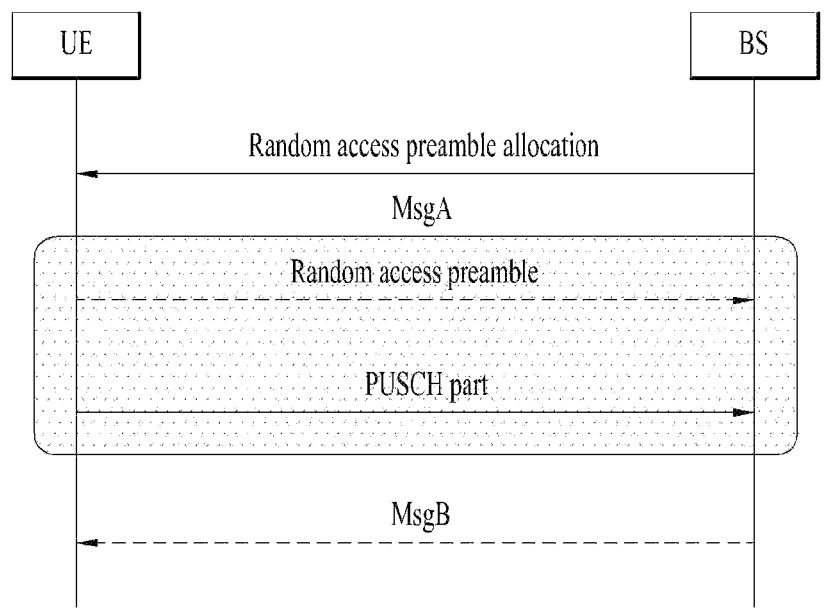

As illustrated in FIG. 15(a), the 2-step random access procedure may include two steps: transmission of a UL signal (referred to as MsgA) from the UE to the BS and transmission of a DL signal (referred to as MsgB) from the BS to the UE.

MsgA may include elements of Msg1 and Msg3 of the 4-step random access procedure. An RACH preamble may be used on behalf of Msg1, and a PUSCH part may be used on behalf of Msg3. MsgB may include elements of Msg2 and Msg4 of the 4-step random access procedure.

An RACH preamble and a PUSCH part may also be transmitted together in the non-contention random access procedure, as illustrated in FIG. 15(b).

While not shown, the BS may transmit a PDCCH for scheduling MsgB to the UE, which may be referred to as an MsgB PDCCH.

4. Random Access Procedure in Unlicensed Band

Before transmitting each message (e.g., Msg1, Msg2, Msg3, Msg4, MsgA, and/or MsgB) in an unlicensed band in the 4-step and/or 2-step random access procedure, the UE and/or the BS (or gNB) may perform LBT for the unlicensed band.

In the embodiments of the present disclosure, time and frequency resources available for transmission of a RACH preamble from the UE are referred to as an RACH occasion (RO). When the UE wants to transmit Msg1, the UE may allocate and/or select an RO for PRACH transmission. The UE may fail in LBT for the allocated and/or selected RO. In this case, it is necessary to provide an additional RO (in the time domain) to the UE. If a plurality of UEs perform a random access procedure in a specific resource area, the UEs may intensively select a specific RO due to their LBT failure.

An RO allocation and/or selection method for a case in which an LBT operation is performed in a random access procedure in a wireless communication system supporting an unlicensed band is proposed. The following embodiments may be applied not only to RO allocation and/or selection for the 4-step random access procedure, but also to RO allocation and/or selection in the 2-step random access procedure.

While the following description is given on the premise of a random access procedure for initial access, the same thing may be applied to a random access procedure after RRC connection. Further, operations described below as being performed before and after an LBT operation may be performed in a licensed band and/or an unlicensed band, without the LBT operation.

As described before, an SSB may include a PSS, an SSS, and a PBCH. Each of SSBs may contain a different sequence, parameter, and/or content. The SSBs may correspond to analog transmission beams of different BSs, respectively. A plurality of SSBs may be transmitted in time division multiplexing (TDM).

An SSB-to-RO mapping ratio is the number of ROs mapped to one SSB. The SSB-to-RO mapping ratio may be expressed as the number of ROs corresponding to one SSB. The SSB-to-RO mapping ratio may be determined using one RACH association cycle as a reference time period. For example, when the SSB-to-RO mapping ratio is set to 1 to N, N ROs may be mapped to each of SSBs in a single RACH association cycle. One or more ROs mapped to one SSB may be represented as a set of ROs mapped to one SSB.

An RACH slot refers to a slot available for RO mapping and/or allocation. The RACH slot may be configured in one or more radio frame period units. An RO may be mapped and/or allocated to all symbols or a specific symbol of the RACH slot. The specific symbol may be the first symbol of the RACH slot. Alternatively, the specific symbol may be the last symbol of the RACH slot. ROs may be mapped and/or allocated to a plurality of symbols including the specific symbol in the RACH slot.

The RACH association cycle refers to a minimum time period in which when an SSB-to-RO mapping ratio is set for each SSB, all ROs for all SSBs are mapped and/or allocated once. For example, when three SSBs, SSB0, SSB1, and SSB2 exist, and N0 ROs, N1 ROs, and N2 ROs are mapped to SSB0, SSB1, SSB2, respectively, a minimum time period in which all of N0+N1+N2 ROs are mapped and/or allocated may be one RACH association cycle.

An RACH association period is defined as a minimum time period of $10 \times 2^a$ ms including one RACH association cycle, where a may be an integer such as 0, 1, 2, 3, 4, or the like. An RACH association pattern period is defined as a time period including one or more RACH association periods. For example, when a belongs to {0, 1, 2, 3, 4}, the RACH-association pattern period may span 160 ms.

Method of Allocating ROs Corresponding to Different SSBs

To allocate ROs to each SSB, an RO group including a plurality of R ROs located in different time domains (and in the same frequency resource domain) may first be defined. The R ROs of one RO group may or may not be contiguous with each other in the time domain. When ROs are allocated to each of a plurality of different SSBs, the RO allocation may be performed in units of an RO group.

For example, for RO mapping and/or allocation, frequency-domain resources are given as F_m (m=0, 1, ..., M−1), and time-domain resources are given as T_k (k=0, 1, ..., K−1). The SSB-to-RO mapping ratio may be set to 1 to N. When N ROs are mapped and/or allocated to each SSB, frequency-first mapping and time-second mapping may be performed in units of an RO group within a given frequency/time resource set. For example, when R=2, M=8, K=4, and N=8 for four SSBs #0, #1, #2, and #3, ROs may be mapped and/or allocated to each SSB in the following orders.

N ROs SSB #0-RO #0 to SSB #0-RO #7 for SSB #0 may be sequentially mapped in the order of {F_0, T_0}, {F_0, T_1}, {F_1, T_0}, {F_1, T_1}, {F_2, T_0}, {F_2, T_1}, {F_3, T_0}, and {F_3, T_1}. Since the RO group includes two ROs (R=2), {F_0, T_0} and {F_0, T_1} located in a first frequency domain and belonging to the same RO group are first mapped to SSB #0. Then, {F_1, T_0} and {F_1, T_1} located in a second frequency domain and belonging to the same RO group are mapped to SSB #0. {F_2, T_0}, {F_2, T_1}, {F_3, T_0}, and {F_3, T_1} are mapped to SSB #0 in the same manner.

N ROs SSB #1-RO #0 to SSB #1-RO #7 for SSB #1 may be sequentially mapped in the order of {F_4, T_0}, {F_4, T_1}, {F_5, T_0}, {F_5, T_1}, {F_6, T_0}, {F_6, T_1}, {F_7, T_0}, and {F_7, T_1}. Since the ROs corresponding to SSB #0 have been mapped in the frequency area of F_0 to F_3, mapping of RO groups to SSB #1 starts in F_4. Similarly to the RO mapping for SSB #0, {F_4, T_0} and {F_4, T_1} located in a first frequency domain and belonging to the same RO group are first mapped to SSB #1. Then, {F_5, T_0}, {F_5, T_1}, {F_6, T_0}, {F_6, T_1}, {F_7, T_0}, and {F_7, T_1} are mapped to SSB #1 in the same manner.

N ROs SSB #2-RO #0 to SSB #2-RO #7 for SSB #2 may be sequentially mapped in the order of {F_0, T_2}, {F_0, T_3}, {F_1, T_2}, {F_1, T_3}, {F_2, T_2}, {F_2, T_3}, {F_3, T_2}, and {F_3, T_3}. Since the ROs corresponding to SSB #1 and SSB #2 are mapped to the frequency-domain resources F_0 to F_7 by frequency-first mapping, mapping of ROs to SSB #2 starts in F_0 of T_2 by time-second mapping. Similarly to the RO mapping for SSB #0, {F_0, T_2} and {F_0, T_3} located in a first frequency domain and belonging to the same RO group are first mapped to SSB #2. Then, {F_1, T_2}, {F_1, T_3}, {F_2, T_2}, {F_2, T_3}, {F_3, T_2}, and {F_3, T_3} are mapped to SSB #2 in the same manner.

N ROs SSB #3-RO #0 to SSB #3-RO #7 for SSB #3 may be sequentially mapped in the order of {F_4, T_2}, {F_4, T_3}, {F_5, T_2}, {F_5, T_3}, {F_6, T_2}, {F_6, T_3}, {F_7, T_2}, and {F_7, T_3}. Similarly to the RO mapping for SSB #0, {F_4, T_2} and {F_4, T_3} located in a first frequency domain and belonging to the same RO group are first mapped to SSB #2. Then, {F_5, T_2}, {F_5, T_3}, {F_6, T_2}, {F_6, T_3}, {F_7, T_2}, and {F_7, T_3} are mapped to SSB #2 in the same manner.

RO group-wise frequency-first mapping with an SSB-to-RO mapping ratio set to 1 to N may be identical to RO group-wise frequency-first mapping with an SSB-to-RO group mapping ratio set to 1 to N'. In other words, it may be said that with the SSB-to-RO group mapping ratio set to 1 to N', N' RO groups are mapped and/or allocated to each SSB in a given frequency/time resource set by RO group-wise frequency-first and time-second mapping. N'=N/R. For example, ROs may be mapped and/or allocated to each SSB in the same order, for R=2, M=8, K=4, and N=8 for four SSBs #0, #1, #2, and #3 and for R=2, M=8, K=4, and N'=4 for four SSBs #0, #1, #2, and #3.

In another method, with the SSB-to-RO (group) mapping ratio set to 1 to N', N' ROs may be mapped and/or allocated to a specific SSB in a frequency-first manner in units of an RO (not in units of an RO group) in a given frequency/time resource set. Then, the remaining N' ROs may be mapped and/or allocated repeatedly in different time-domain resources of the same frequency as that of the mapped N' ROs. In other words, an RO set of N' ROs may be mapped and/or allocated repeatedly in R different time domains of the same frequency. For example, when R=2, M=8, K=4, and N'=4 for four SSBs #0, #1, #2, and #3, ROs may be mapped and/or allocated to each SSB in the order illustrated in FIG. 17. Because N'=N/R, the number of ROs corresponding to one SSB, N may be given as N=N'×R.

N ROs SSB #0-RO #0 to SSB #0-RO #7 for SSB #0 may be sequentially mapped in the order of {F_0, T_0}, {F_1, T_0}, {F_2, T_0}, {F_3, T_0}, {F_0, T_1}, {F_1, T_1}, {F_2, T_1}, and {F_3, T_1}. Since frequency-first mapping is performed in units of an RO, not in units of an RO group, N' ROs are first mapped in the same time domain T_0 in the order of {F_0, T_0}, {F_1, T_0}, {F_2, T_0}, and {F_3, T_0}, even though R=2. Then, an RO set of N' ROs is repeatedly mapped to different time domains of the same frequency as that of the frequency domains F_0 to F_3 in which the set of N' ROs exist, {F_0, T_1}, {F_1, T_1}, {F_2, T_1}, and {F_3, T_1}.

N ROs SSB #1-RO #0 to SSB #1-RO #7 for SSB #1 may be sequentially mapped in the order of {F_4, T_0}, {F_5, T_0}, {F_6, T_0}, {F_7, T_0}, {F_4, T_1}, {F_5, T_1}, {F_6, T_1}, and {F_7, T_1}. Since the ROs corresponding to SSB #0 have been mapped in the frequency area of F_0 to F_3, mapping of RO groups for SSB #1 starts in F_4. Like the RO mapping for SSB #0, even though R=2, N' ROs are first mapped in the same time domain T_0 in the order of {F_4, T_0}, {F_5, T_0}, {F_6, T_0}, and {F_7, T_0}. Then, an RO set of N' ROs is repeatedly mapped in different time domains of the same frequency as that of the frequency domains F_4 to F_7 in which the set of N' ROs exist, {F_4, T_1}, {F_5, T_1}, {F_6, T_1}, and {F_7, T_1}.

N ROs SSB #2-RO #0 to SSB #2-RO #7 for SSB #2 may be sequentially mapped in the order of {F_0, T_2}, {F_1, T_2}, {F_2, T_2}, {F_3, T_2}, {F_0, T_3}, {F_1, T_3}, {F_2, T_3}, and {F_3, T_3}. Since the ROs corresponding to SSB #0 and SSB #1 have been mapped in the frequency area of F_0 to F_7 of T_0 and T_1 in a frequency-first manner, mapping of ROs to SSB #2 starts in F_0 of T_2 in a time-second manner. Like the RO mapping for SSB #0, even though R=2, N' ROs are first mapped in the same time domain T_2 in the order of {F_0, T_2}, {F_1, T_1}, {F_2, T_2}, and {F_3, T_2}. Then, an RO set of N' ROs is repeatedly mapped in different time domains of the same frequency as that of the frequency domains F_0 to F_3 in which the set of N' ROs exist, {F_0, T_3}, {F_1, T_3}, {F_2, T_3}, and {F_3, T_3}.

N ROs SSB #0-RO #0 to SSB #0-RO #7 for SSB #3 may be sequentially mapped in the order of {F_4, T_2}, {F_5, T_2}, {F_6, T_2}, {F_7, T_2}, {F_4, T_3}, {F_5, T_3}, {F_6, T_3}, and {F_7, T_3}. Since the ROs corresponding to SSB #2 have been mapped in the frequency area of F_0 to F_3, mapping of RO groups to SSB #3 starts in F_4. Like the RO mapping for SSB #0, even though R=2, N' ROs are first mapped in the same time domain T_2 in the order of {F_4, T_2}, {F_5, T_2}, {F_6, T_2}; and {F_7, T_2}. Then, an RO set of N' ROs is repeatedly mapped in different time domains of the same frequency as that of the frequency domains F_4 to F_7 in which the set of N' ROs exist, {F_4, T_3}, {F_5, T_3}, {F_6, T_3}, and {F_7, T_3}.

In another method, with an SSB-to-RO mapping ratio set to 1 to N, N ROs may be mapped and/or allocated to a specific SSB at an interval of R ROs in a given frequency/time resource set in an RO-wise frequency-first manner. For example, when R=2, M=8, K=4, and N=8 for four SSBs #0, #1, #2, and #3, ROs may be mapped and/or allocated to each SSB in the order illustrated in FIG. 18.

N ROs SSB #0-RO #0 to SSB #0-RO #7 for SSB #0 may be sequentially mapped in the order of {F_0, T_0}, {F_2, T_0}, {F_4, T_0}, {F_6, T_0}, {F_0, T_1}, {F_2, T_1}, {F_4, T_1}, and {F_6, T_1}. Since frequency-first mapping is performed in units of an RO rather than in units of an RO group, even though R=2, RO mapping is first performed in the order of {F_0, T_0}, {F_2, T_0}, {F_4, T_0}, and {F_6, T_0} in the same time domain, T_0, with a frequency spacing of 2 between ROs for R=2. However, because M=8, the frequency resource set for SSB #0 exists only in up to F_7. Therefore, ROs following {F_6, T_0} are mapped in the order of {F_0, T_1}, {F_2, T_1}, {F_4, T_1}, and {F_6, T_1} in a time-second manner.

N ROs SSB #1-RO #0 to SSB #1-RO #7 for SSB #1 may be sequentially mapped in the order of {F_1, T_0}, {F_3, T_0}, {F_5, T_0}, {F_7, T_0}, {F_1, T_1}, {F_3, T_1}, {F_5, T_1}, and {F_7, T_1}. ROs are mapped to {F_3, T_0}, {F_5, T_0}, {F_7, T_0}, and {F_1, T_0} with a frequency spacing of 2, starting from the first time/frequency resource {F_1, T_0} except for the ROs mapped to SSB #0. Since there are no more frequency resources available in T_0, RO mapping is then performed in {F_1, T_1}, {F_3, T_1}, {F_5, T_1}, and {F_7, T_1}.

N ROs SSB #2-RO #0 to SSB #2-RO #7 for SSB #2 may be sequentially mapped in the order of {F_0, T_2}, {F_2, T_2}, {F_3, T_2}, {F_6, T_2}, {F_0, T_3}, {F_2, T_3}, {F_5, T_3}, and {F_6, T_3}. Because the ROs corresponding to SSB #1 and SSB #2 have been mapped to the frequency-domain resources of F_0 to F_7 in T_0 and T_1 by frequency-first mapping, mapping of the ROs for SSB #2 starts in F_0 of T_2 in a time-second manner. ROs are mapped to {F_2, T_2}, {F_4, T_2}, and {F_6, T_2} with a frequency spacing of 2, starting from the first time/frequency resource {F_0, T_2}. The ROs after {F_6, T_2} are mapped in the order of {F_0, T_3}, {F_2, T_3}, {F_4, T_3}, and {F_6, T_3} by time-second mapping.

N ROs SSB #3-RO #0 to SSB #3-RO #7 for SSB #3 may be sequentially mapped in the order of {F_1, T_2}, {F_3, T_2}, {F_5, T_2}, {F_7, T_2}, {F_1, T_3}, {F_3, T_3}, {F_5, T_3}, and {F_7, T_3}. ROs are mapped to {F_3, T_2}, {F_5, T_2}, and {F_7, T_2} with a frequency spacing of 2, starting from {F_1, T_2} at the earliest position among available resources after the RO mapping to SSB #3. Since there are no more frequency resources available in T_2, RO mapping is then performed in {F_1, T_3}, {F_3, T_3}, {F_5, T_3}, and {F_7, T_3}.

In another method, an OFDM symbol group unit (in the time domain) forming one RO may be defined as a symbol-group (S-group). In other words, an S-group may include one RO mapped and/or allocated to one or more OFDM symbols. With an SSB-to-RO mapping ratio set to 1 to N, N ROs may be mapped and/or allocated to a specific SSB in units of an RO in an S-group-first, frequency-second, and RACH slot-last manner within a given frequency/time resource set for the specific SSB.

In another method, ROs may be mapped and/or allocated to a specific SSB in units of an RO in a frequency-first and time-second manner in a given frequency/time resource set within a given one RACH slot for the specific SSB according to a configured SSB-to-RO mapping ratio. Subsequently, the RO set mapped in the RACH slot may be mapped and/or allocated repeatedly in one or more other RACH slots.

In the above-described embodiments, the same single RA-RNTI value may be configured for the R ROs of the same single RO group. Further, the same single RA-RNTI value may be configured for a plurality of ROs for the same SSB, which are continuous in the time domain. The same single RA-RNTI value may be determined based on a specific one of the plurality of ROs. The specific RO may be, for example, the earliest RO in time among the plurality of ROs.

Further, when the UE receives an RAR corresponding to a transmitted RO from the BS, which RO corresponds to the RAR among the plurality of ROs may be indicated to the UE by a DCI field of a PDCCH that schedules the RAR. Alternatively, which RO corresponds to the RAR among the plurality of ROs may be indicated to the UE by the RAR itself or a PDSCH including the RAR.

Additionally, the UE starts to attempt LBT in the earliest one of the plurality of ROs mapped to the SSB in the time domain. When LBT is successful, the UE transmits a PRACH in the earliest RO in the time domain. When failing in the LBT for the earliest RO in the time domain, the UE may sequentially attempt the LBT operation and PRACH transmission in the ROs in the time domain.

Figure 19:
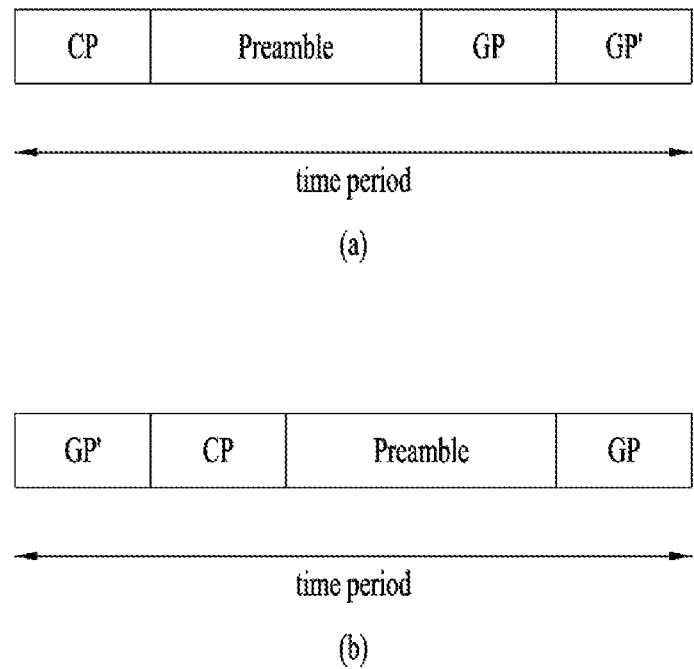
FIG. 19 is a time period for an RO according to an embodiment of the present disclosure.

Different SSBs may be configured to correspond to ROs that are consecutively mapped and/or allocated in the time domain. Alternatively, even though the same SSB is configured to correspond to the consecutively mapped and/or allocated ROs in the time domain, the UE may select one of the consecutive ROs and attempt an LBT operation and a PRACH transmission in the selected RO, so that UEs are distributed to different ROs. A PRACH format configured for consecutive ROs may be configured in the form of {CP+preamble+GP+GP'} as illustrated in FIG. 19(a) or {GP'+CP+preamble+GP} as illustrated in FIG. 19(b). GP' represents a time period configured in consideration of a CCA gap, separately from the afore-described GP. The preamble may include one or more preamble sequences. A total time period may vary depending on a preamble sequence and/or a PRACH format. In the case of {GP+GP'}, it may be configured/set to a single guard period value without any distinction.

In another method, for ROs corresponding to the same SSB which are consecutively mapped and/or allocated in the time domain, the UE may attempt LBT, starting in the earliest RO in the time domain. If LBT is successful, the UE may transmit the PRACH in the earliest RO in the time domain. If the LBT for the earliest RO in the time domain fails, the UE may sequentially attempt the LBT operation and PRACH transmission in the ROs in the time domain. A PRACH format for the consecutive ROs may be configured in the form of {CP+preamble} without a GP and/or GP'. For example, a PRACH format configured for consecutive ROs may be configured within a time period except for the GP and GP' in the structures illustrated in FIG. 19.

When RO mapping and/or allocation is performed in one or more of the proposed methods, i) the number of time resources (e.g. S-groups) to which ROs are mapped and/or allocated within a specific time period may be set differently for each SSB. For example, let the number of time resources in which the UE may attempt LBT for one SSB be denoted by A. Then, A0 for SSB #0 and A1 for SSB #1 may be different from each other. And/or when RO mapping and/or allocation is performed in one or more of the proposed methods, ii) the position of time resources (e.g., S-group) to which ROs are mapped and/or allocated may be fixedly set for each SSB.

In order to reduce the occurrences of such a phenomenon as i) and/or ii), the positions of ROs corresponding to the same SSB may be changed in units of an RACH association cycle, a RACH association period, and/or an RACH association pattern period. In addition, the positions of ROs corresponding to the same SSB may be changed in units of a multiple of an RACH association cycle, an RACH association period, and/or an RACH association pattern period. For example, the positions of ROs corresponding to one SSB may be interleaved in each configured unit period. In another example, an SSB (index) order may be interleaved in each configured unit period, and the positions of ROs corresponding to each SSB may be sequentially determined/mapped according to the interleaved order.

Method of Extending RAR Window and CR Timer

In the unlicensed band, when the BS attempts to transmit an RAR, the RAR transmission may be dropped or delayed due to LBT failure. For this reason, an RAR window size for the unlicensed band needs to be larger than an RAR window size defined in the legacy licensed band system. In other words, the length of the RAR window for the unlicensed band may be extended longer than that of the RAR window for the licensed band. When the RAR window size increases, the number of ROs to be represented and/or identified by RA-RNTIs increases. In other words, as the RAR window size increases, the number of RA-RNTIs to represent and/or identify RARs increases. When the RAR window size increases to or above a predetermined value, it may be impossible to represent and/or identify an increased number of ROs with a limited number of RNTI bits (e.g., 16 bits).

To avert this problem, an RA-RNTI value may be calculated based on the index of at least one of a radio frame, a subframe, a slot, and/or a symbol actually used for RO mapping according to a configuration in an SIB. Further, the RA-RATI value may be calculated based on the index of at least one of a frequency, a subband, and/or a carrier actually used for RO mapping. Alternatively, the RA-RNTI value may be calculated by a combination of at least one of a radio frame index, a subframe index, a slot index, a symbol index, a frequency index, a subband index, and/or a carrier index actually used for RO mapping. Alternatively, the RA-RNTI value may be calculated based on a (localized) re-indexed index, not an index actually used for RO mapping. For example, slot indexes may be re-indexed consecutively in a set of slot indexes actually used for RO mapping according to a configuration in an SIB.

In a specific example, slots with K slot indexes {x_1, x_2, . . . , x_K} (K is less than N) may be configured as RACH slots during a specific time period including a total of N slots corresponding to an RAR window size. The total number of slots actually used for RO mapping may be used as an input parameter of an equation for calculating the RA-RNTI value, and the value may be K. When slot indexes to which ROs are mapped are used as the input parameter of the equation for calculating the RA-RNTI value, slot indexes to which the ROs are actually mapped {x_1, x_2, . . . , x_K} may be re-indexed to {0, 1, . . . , K−1} (in a localized manner). Re-indexing may be applied to one or more of radio frame, subframe, slot, symbol, frequency, subband, and/or carrier indexes.

In another method, at least one of a radio frame index, a subframe index, a slot index, a symbol index, a frequency index, a subband index, and/or a carrier index that represents and/or identifies an RO or a part (some bit(s)) of the index may be indicated by DCI scheduling an RAR or the payload of the RAR, and a part corresponding to the remaining index (bits) except for the part (bit(s)) may be represented and/or identified by an RA-RNTI. For example, the radio frame index and/or the carrier index and/or the subband index (or the part (bit(s)) of the index) may be indicated by the DCI scheduling the RAR or the payload of the RAR, and the remaining index (bits) may be represented and/or identified by the RA-RNTI.

In a specific example, when a frame index (or some bits of the frame index) is indicated by the payload of an RAR, the remaining index (or bits), that is, at least one of a slot index, a symbol index, a frequency index, a subband index, and/or a carrier index may be represented and/or identified by an RA-RNTI. In other words, if the frame index (or some bits of the frame index) is indicated by the payload of the RAR, the RA-RNTI may be configured based on one or more of the remaining indexes except for the frame index among the resource indexes related to the RO. The frame index may include a hyper frame index, a system frame index, a radio frame index, and/or a subframe index. The frame index may be replaced with a frame number. Some bits of the frame index may be one or more least significant bit(s) (LSB(s)) or one or more most significant bit(s) (MSB(s)). If only the frame index or some bits of the frame index are indicated by the RAR payload, the RA-RNTI may be configured by Equation 4, for example.

$$\text{RA-RNTI} = 1 + s\_id + 14 \times t\_id + 14 \times 80 \times f\_id + 14 \times 80 \times 8 \times ul\_carrier\_id \quad \text{[Equation 4]}$$

where s_id is a symbol index, t_id is a slot index, f_id is a frequency index, and ul_carrier_id is a carrier index.

Additionally, a different RAR window size may be configured for each RO (or RO group). For example, the UE may first attempt a PRACH transmission in an RO configured with a smaller RAR window size. When the UE fails in receiving an RAR, the UE may attempt to retransmit a PRACH in an RO configured with a larger RAR window size.

In the unlicensed band, an RO set may be dynamically configured in a channel occupation time (COT) occupied by a specific DL signal/channel in addition to an RO set semi-statically configured by an SIB as is done conventionally. An RA-RNTI corresponding to the dynamic RO set (or ROs belonging to the dynamic RO set) may be configured to have a different value from an RA-RNTI corresponding to the semi-static RO set. For example, the RA-RNTI corresponding to the dynamic RO set may be set to a value greater than a maximum value of the RA-RNTI corresponding to the semi-static RO set. For example, the maximum value of the RA-RNTI corresponding to the semi-static RO set may be added as an offset in an equation for calculating the RA-RNTI value corresponding to the dynamic RO set. Alternatively, information about the RA-RNTI value corresponding to the dynamic RO set may be directly indicated by a signal (e.g. PDCCH or PDSCH) that configures and/or allocates the dynamic RO set. The information about the RA-RNTI value corresponding to the dynamic RO set may include, for example, at least one of a starting/ending RA-RNTI value, a range of RA-RNTI values, and/or the number of RA-RNTI values.

An RAR window size for a corresponding PRACH/RO may be indicated and/or changed by a PDCCH order triggering a PRACH transmission or by DCI configuring the dynamic RO set. For example, the RAR window size may be indicated as and/or changed to a size different from that configured in an SIB by the PDCCH order triggering a PRACH transmission or the DCI configuring the dynamic RO set. Candidates of the RAR window size that may be indicated by a PDCCH/DCI may be configured by an SIB or UE-specific RRC signaling.

Further, in the unlicensed band, when the BS wants to transmit Msg4, the transmission of Msg4 may be dropped or delayed due to LBT failure. For this reason, a maximum value of a contention resolution (CR) timer for the unlicensed band needs to be extended beyond a maximum value of the CR timer defined for the legacy licensed band system. Therefore, the maximum value of the CR timer may be indicated and/or changed by an RAR. Maximum value candidates for the CR timer that may be indicated by the RAR may be predefined for the UE or may be configured for the UE by an SIB.

Additionally, a different maximum value of the CR timer may be configured for each RO (or RO group). For example, the UE first attempts a PRACH transmission in an RO configured with a smaller maximum CR timer value. When the UE fails in receiving Msg4, the UE may attempt a PRACH retransmission in an RO with a larger maximum CR timer value. The maximum value of the CR timer may be expressed as a max CR timer.

Implementation Example

One or more of the above-described operations may be organically combined to implement embodiments of the present disclosure.

Figure 20:
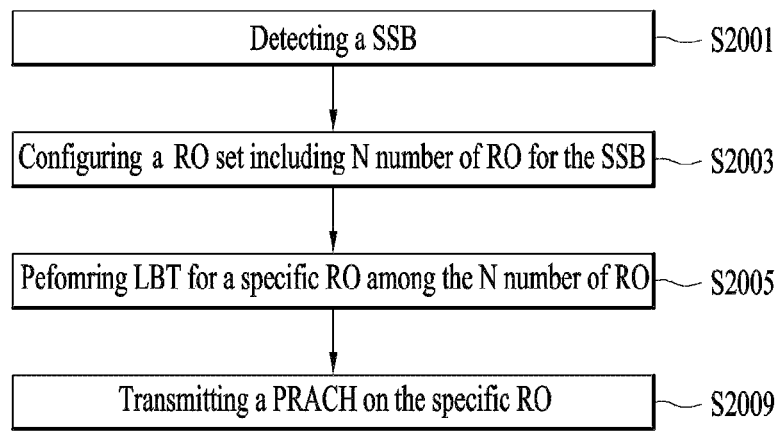
FIGS. 20 and 21 are diagrams illustrating a discontinuous reception (DRX) cycle.

One of embodiments implemented by a combination of the operations described in the present disclosure may be given as illustrated in FIG. 20.

FIG. 20 is a flowchart illustrating a method of transmitting and receiving a signal according to an embodiment of the present disclosure.

Referring to FIG. 20, an embodiment of the present disclosure implemented by a communication device may include detecting an SSB (S2201), configuring an RO set of N ROs for the detected SSB (S2203), performing LBT for a specific one of the N ROs (S2205), and transmitting a PRACH in the specific RO for which the LBT is successful (S2007).

When N ROs of RO groups are allocated in a predetermined resource area, each RO may be allocated based on an RO group or an S-group. As described above, an RO group may include R ROs located in different time domains of the same frequency domain in a predetermined resource area.

Figure 16:
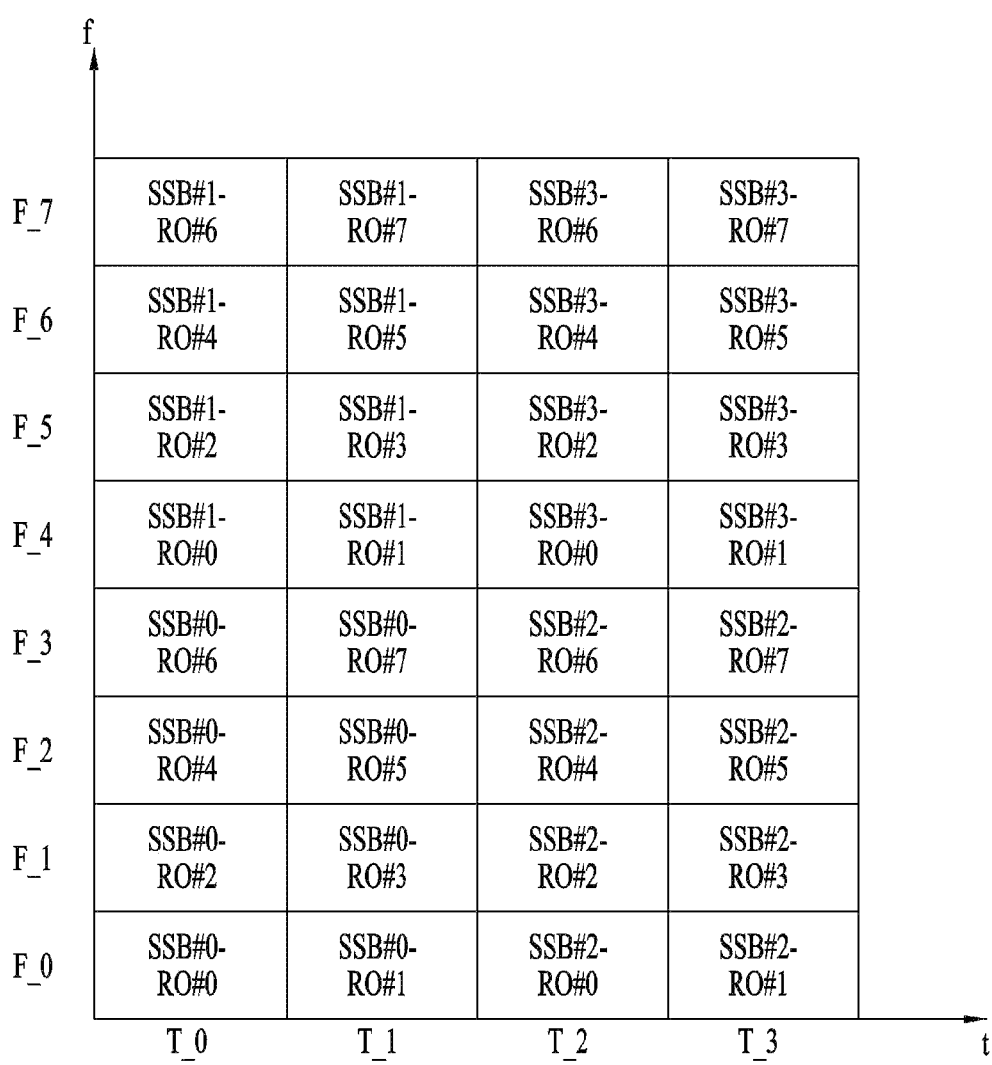
FIGS. 16 to 18 illustrate a unit period according to an embodiment of the present disclosure.

Further, as described with reference to FIG. 16, the N ROs may be allocated in units of an RO group. In this case, The N ROs are allocated sequentially from a low frequency to a high frequency, and the ROs of the same RO group are allocated sequentially in time from a previous time.

Figure 17:
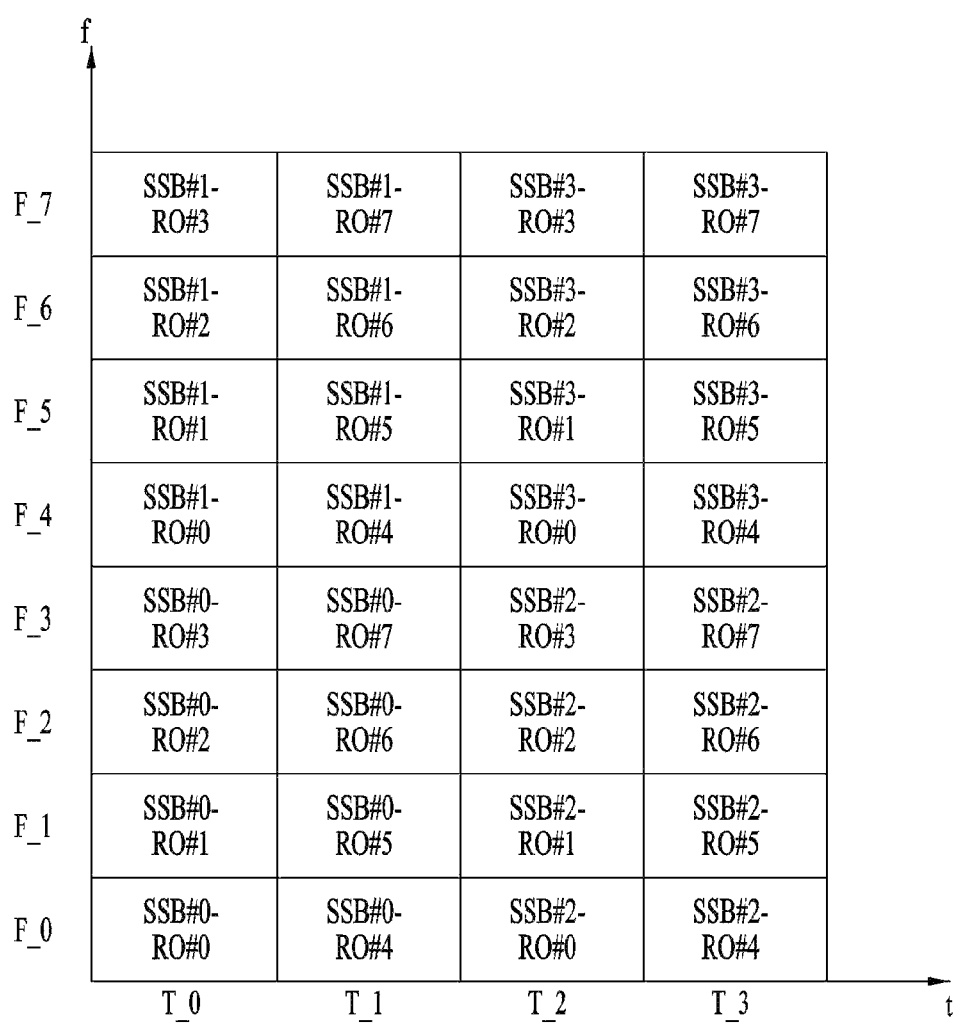

Further, as described with reference to FIG. 17, the N ROs may be allocated in units of an RO. In this case, the N ROs are allocated sequentially to N' frequency areas from a low frequency in consideration of an SSB-to-RO group mapping ratio of 1 to N'. RO-wise allocation to the N' frequency domains is repeatedly performed in R time domains.

Figure 18:
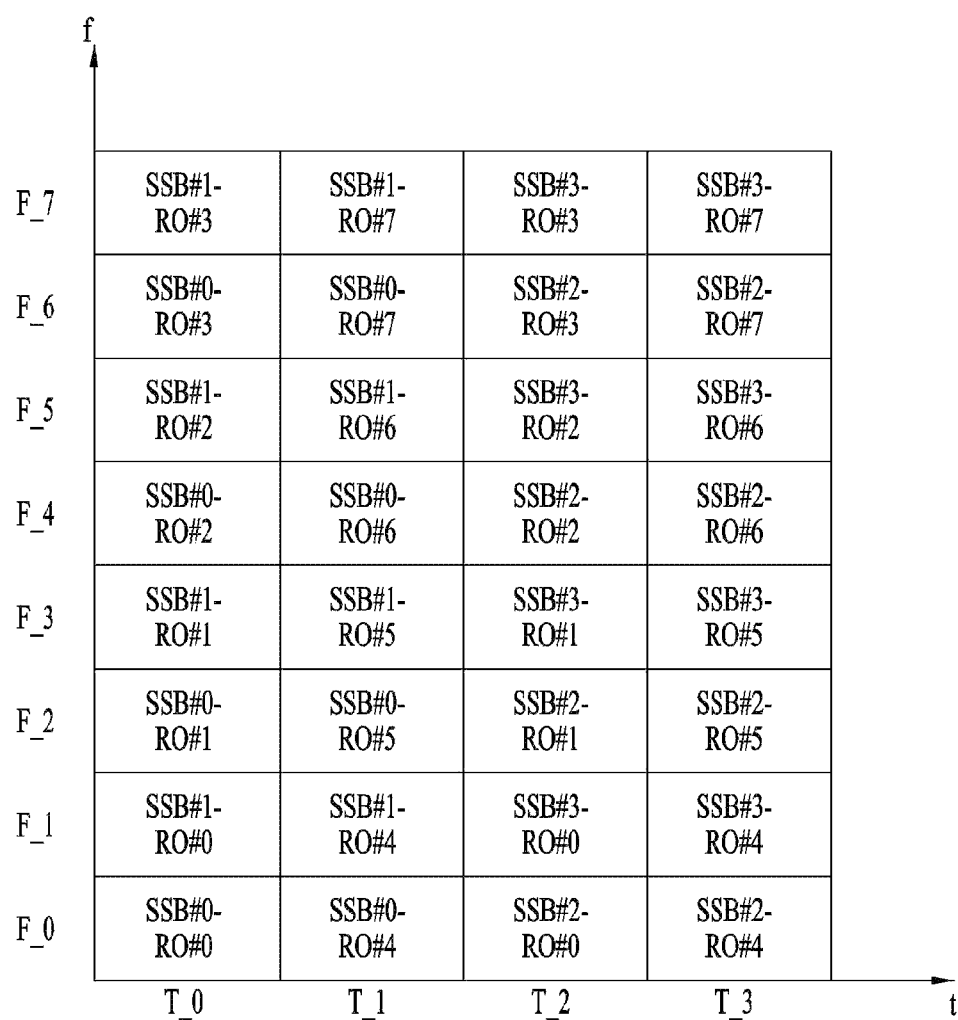

Further, as described with reference to FIG. 18, when the N ROs are allocated in units of an RO, each of N' frequency area indexes is different from its adjacent frequency area index by R.

Further, as described above, when all N ROs for a specific SSB are not mapped and/or allocated to a first RACH slot, the remaining ROs for the specific SSB may be mapped and/or allocated to a second RACH slot. Within one RACH slot, ROs may be mapped and/or allocated in a time-first and frequency-second manner or in a frequency-first and time-second manner.

The same RA-RNTI value may be configured for the R ROs of one RO group.

After step S2007, the UE may receive an RAR corresponding to the transmitted PRACH. Information indicating whether the received RAR corresponds to a specific RO in which the PRACH was transmitted may be included in an RAR, a PDCCH that schedules the RAR, and/or a PDSCH that includes the RAR.

The specific RO in which the PRACH is transmitted may be randomly selected from among consecutive ROs by the UE, so that UEs may be distributed to the consecutive ROs mapped and/or allocated in the time domain. A PRACH format for the PRACH related to the consecutive ROs may be configured in the orders illustrated in FIG. 19.

The UE may select the earliest one of the consecutive ROs in the time domain as the specific RO in which the PRACH is transmitted. Unlike FIG. 19, the PRACH format of the PRACH related to the consecutive ROs may be configured in the order of CP and preamble.

Allocation of an RO set corresponding to an SSB may be periodically repeated. The periodicity may be set in units of an RACH association cycle, an RACH association period, and/or an RACH association pattern period. Further, the periodicity may be set in units of a multiple of the RACH association cycle, the RACH association period, and/or the RACH association pattern period. When the N ROs of the RO set are allocated in a next cycle after being allocated to a predetermined first resource area, they may be allocated to positions obtained by interleaving positions of the predetermined first resource area to which the ROs are allocated. Then, the N ROs of the RO set may be allocated to interleaved positions in each time period.

In addition to the operation of FIG. 20, one or more of the operations described with reference to FIGS. 1 to 19 may be performed in combination.

Figure 21:
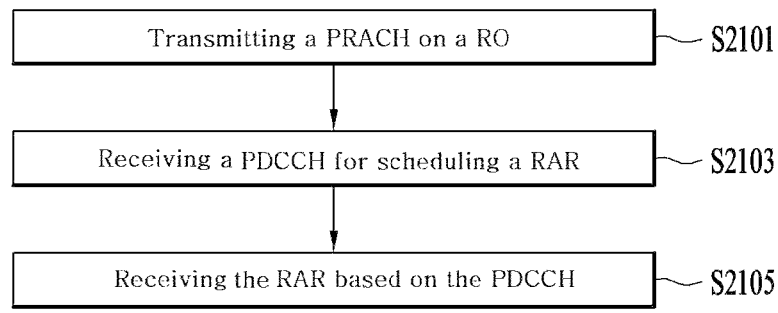

One of the embodiments implemented by a combination of the afore-described operations of the present disclosure may be given as illustrated in FIG. 21.

Referring to FIG. 21, an embodiment of the present disclosure implemented by a communication device includes transmitting a PRACH in an RO (S2101), receiving a PDCCH for scheduling an RAR in response to the PRACH (S2105), and receiving the RAR based on the PDCCH (S2107).

The PDCCH that schedules the RAR may be CRC-masked with an RA-RNTI. The RAR may include a frame index of an RO in which the PRACH is transmitted or some bits of the frame index. The frame index may include a hyper frame number, a system frame number, a radio frame number, and/or a subframe number. The RA-RNTI may be configured based on one or more of the remaining indexes excluding the frame index among resource indexes related to the RO in which the PRACH is transmitted. In other words, the RO in which the PRACH is transmitted may be represented and/or identified by the RA-RNTI, except for the frame index of the RO. The remaining indexes may include, for example, one or more of a symbol index, a slot index, a frequency index, and/or a carrier index. The remaining indexes may further include a subband index. When the RAR includes some bits of the frame index in which the PRACH is transmitted, the bits may be LSBs or MSBs of the frame index.

In addition to the above-described operation of FIG. 21, one or more of the operations described before with reference to FIGS. 1 to 20 may be performed in combination.

For example, when operations S2101 to S2105 are performed, the RO in which the PRACH is transmitted in operation S2101 may be a specific RO selected in operations S2001 to S2005. In other words, operations S2009 and S2101 process are the same operation, and operations S2001, S2003, S2005, S2009 (S2101), S2103, and S2105 may be sequentially performed.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 22:
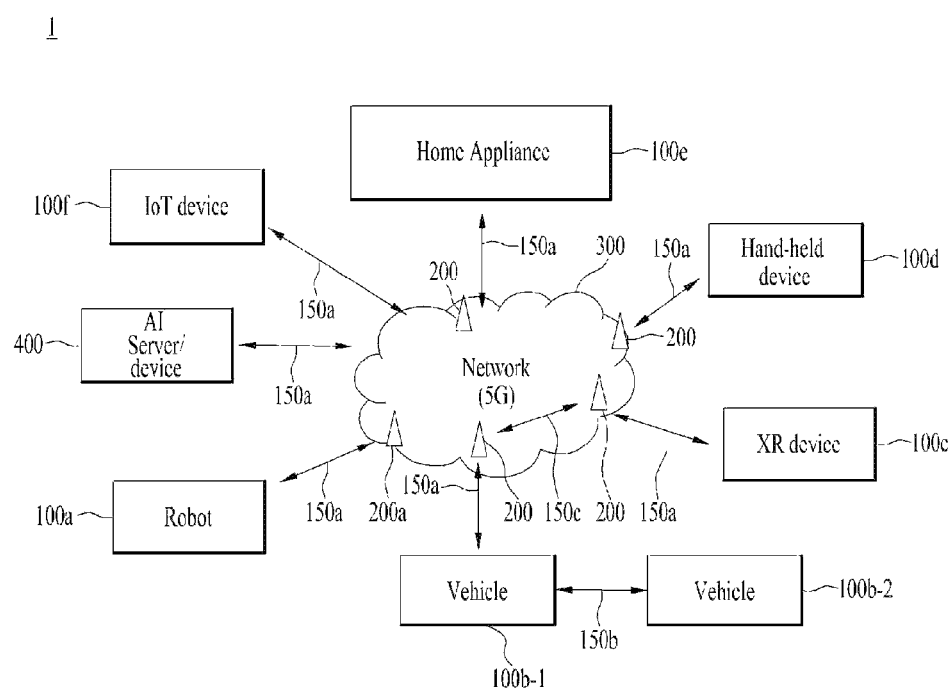
FIGS. 22 to 25 illustrate devices according to an embodiment of the present disclosure.

FIG. 22 illustrates a communication system 1 applied to the present disclosure.

Referring to FIG. 22, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 23:
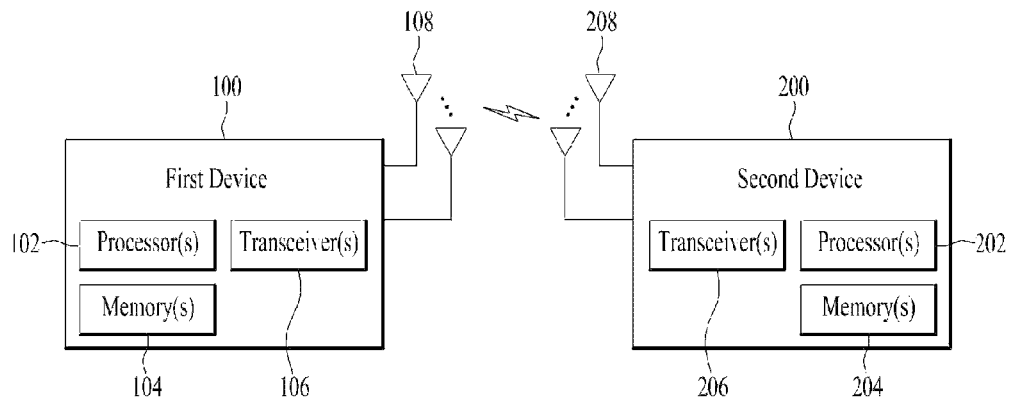

FIG. 23 illustrates wireless devices applicable to the present disclosure.

Referring to FIG. 23, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 24:
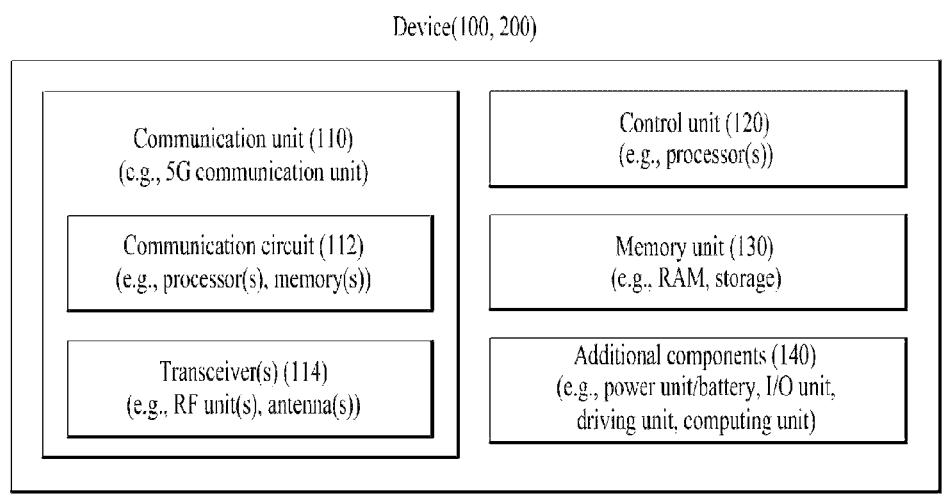

FIG. 24 illustrates another example of a wireless device applied to the present disclosure. The wireless device may be implemented in various forms according to a use case/service (refer to FIG. 22).

Referring to FIG. 24, wireless devices 100 and 200 may correspond to the wireless devices 100 and 200 of FIG. 23 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcasting terminal, a hologram device, a public safety device, an MTC device, a medical device, a FinTech device (or a finance device), a security device, a climate/environment device, the AI server/device (400 of FIG. 22), the BSs (200 of FIG. 22), a network node, or the like. The wireless device may be mobile or fixed according to a use case/service.

In FIG. 24, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 25:
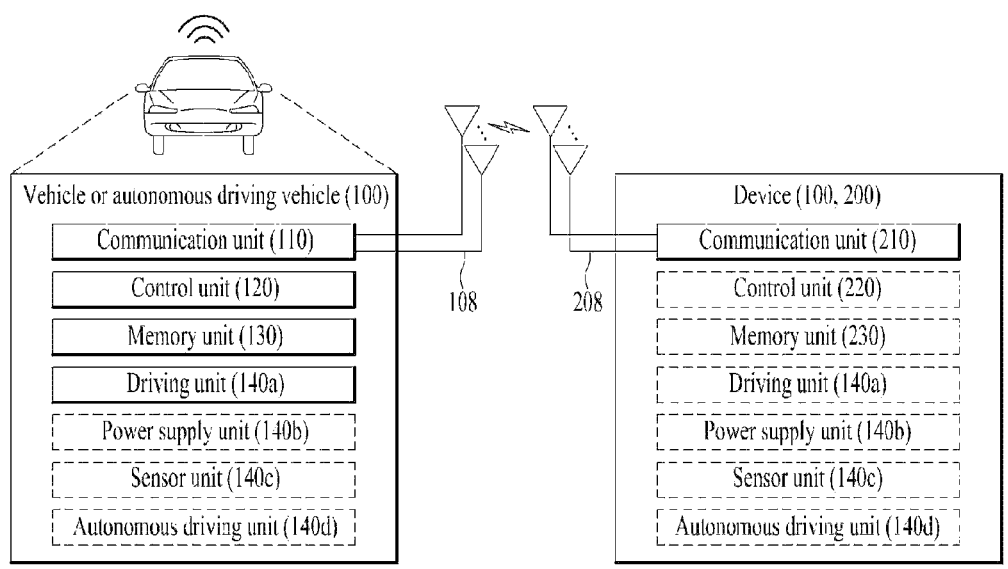

Example of Vehicle or Autonomous Driving Vehicle to which the Present Disclosure is Applied FIG. 25 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting and receiving a signal by a communication device in a wireless communication system, the method comprising:
   transmitting a physical random access channel (PRACH) in a random access channel occasion (RO);
   receiving downlink control information (DCI) for scheduling a random access response (RAR) in response to the PRACH; and
   receiving the RAR based on the DCI,
   wherein the DCI for scheduling the RAR is masked with a random access-radio network temporary identifier (RA-RNTI), and
   wherein the DCI for scheduling the RAR includes information related to a frame index of the RO in which the PRACH was transmitted based on a size of a time window to monitor the RAR being configured to be larger than a specific value.

2. The method according to claim 1, wherein the frame index is a system frame number.

3. The method according to claim 1, wherein the RA-RNTI is configured based on at least one of remaining indexes except for the frame index, among resource indexes related to the RO in which the PRACH was transmitted.

4. The method according to claim 3, wherein the remaining indexes include a symbol index, a slot index, a frequency index, and a carrier index.

5. The method according to claim 1, wherein the information related to the frame index includes least significant bits (LSBs) of the system frame number.

6. The method according to claim 1, further comprising:
detecting a synchronization signal block (SSB); and
configuring an RO set for the detected SSB, the RO set including N ROs,
wherein the RO in which the PRACH was transmitted is an RO for which listen-before-talk (LBT) is successful among the N ROs, the N ROs are allocated based on an RO group in a preconfigured resource area, and the RO group includes R ROs located in different time domains of the same frequency domain in the preconfigured resource area.

7. The method according to claim 6, wherein the N ROs are allocated in units of an RO group sequentially in frequency from a low frequency, with ROs being allocated sequentially in time in the same RO group, or
wherein the N ROs are allocated sequentially in frequency in units of an RO in N' frequency areas from a low frequency, the allocation in units of an RO is repeated in a time-domain area, and N' is a value obtained by dividing N by R.

8. A communication device for transmitting and receiving a signal in a wireless communication system, the communication device comprising:
at least one transceiver;
at least one processor; and
at least one memory operatively coupled to the at least one processor and storing instructions which when executed, cause the at least one processor to perform specific operations,
wherein the specific operations include:
transmitting a physical random access channel (PRACH) in a random access channel occasion (RO);
receiving downlink control information (DCI) for scheduling a random access response (RAR) in response to the PRACH; and
receiving the RAR based on the DCI,
wherein the DCI for scheduling the RAR is masked with a random access-radio network temporary identifier (RA-RNTI), and
wherein the DCI for scheduling the RAR includes information related to a frame index of the RO in which the PRACH was transmitted based on a size of a time window to monitor the RAR being configured to be larger than a specific value.

9. The communication device according to claim 8, wherein the frame index is a system frame number.

10. The communication device according to claim 8, wherein the RA-RNTI is configured based on at least one of remaining indexes except for the frame index, among resource indexes related to the RO in which the PRACH was transmitted.

11. The communication device according to claim 10, wherein the remaining indexes include a symbol index, a slot index, a frequency index, and a carrier index.

12. The communication device according to claim 8, wherein the information related to the frame index includes least significant bits (LSBs) of the system frame number.

13. The communication device according to claim 8, wherein the specific operations further include:
detecting a synchronization signal block (SSB); and
configuring an RO set for the detected SSB, and
wherein the RO set includes N ROs, the RO in which the PRACH was transmitted is an RO for which listen-before-talk (LBT) is successful among the N ROs, the N ROs are allocated based on an RO group in a preconfigured resource area, and the RO group includes R ROs located in different time domains of the same frequency domain in the preconfigured resource area.

14. The communication device according to claim 13, wherein the N ROs are allocated in units of an RO group sequentially in frequency from a low frequency, with ROs being allocated sequentially in time in the same RO group, or
wherein the N ROs are allocated sequentially in frequency in units of an RO in N' frequency areas from a low frequency, the allocation in units of an RO is repeated in a time-domain area, and N' is a value obtained by dividing N by R.

15. A communication device for transmitting and receiving a signal in a wireless communication system, the communication device comprising:
at least one transceiver;
at least one processor; and
at least one memory operatively coupled to the at least one processor and storing instructions which when executed, cause the at least one processor to perform specific operations,
wherein the specific operations include:
receiving a physical random access channel (PRACH) in a random access channel occasion (RO);
transmitting downlink control information (DCI) for scheduling a random access response (RAR) in response to the PRACH; and
transmitting the RAR based on the DCI,
wherein the DCI for scheduling the RAR is masked with a random access-radio network temporary identifier (RA-RNTI), and
wherein the DCI for scheduling the RAR includes information related to a frame index of the RO in which the PRACH was transmitted based on a size of a time window to monitor the RAR being configured to be larger than a specific value.

16. The communication device according to claim 15, wherein the frame index is a system frame number.

17. The communication device according to claim 15, wherein the RA-RNTI is configured based on at least one of remaining indexes except for the frame index, among resource indexes related to the RO in which the PRACH was transmitted.

18. The communication device according to claim 17, wherein the remaining indexes include a symbol index, a slot index, a frequency index, and a carrier index.

19. The communication device according to claim 15, wherein the information related to the frame index includes least significant bits (LSBs) of the system frame number.

* * * * *